(12) United States Patent
Nishida

(10) Patent No.: US 8,422,063 B2
(45) Date of Patent: Apr. 16, 2013

(54) IMAGE FORMING APPARATUS, PRINTING JOB CARRYING OUT METHOD AND COMPUTER READABLE INFORMATION RECORDING MEDIUM

(75) Inventor: Takayori Nishida, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 418 days.

(21) Appl. No.: 12/880,229

(22) Filed: Sep. 13, 2010

(65) Prior Publication Data
US 2011/0063667 A1    Mar. 17, 2011

(30) Foreign Application Priority Data
Sep. 14, 2009 (JP) ................................. 2009-212452

(51) Int. Cl.
G06F 15/00 (2006.01)
G06F 3/12 (2006.01)
G06K 1/00 (2006.01)
G06K 15/00 (2006.01)

(52) U.S. Cl.
USPC ....................................... 358/1.15; 358/1.14

(58) Field of Classification Search .................... None
See application file for complete search history.

(56) References Cited

U.S. PATENT DOCUMENTS

| 2007/0146778 A1 | 6/2007 | Kitagata et al. |
| 2009/0066985 A1* | 3/2009 | Ferlitsch ....................... 358/1.13 |
| 2009/0070864 A1 | 3/2009 | Nishida |
| 2009/0238599 A1* | 9/2009 | Kim ............................... 399/79 |
| 2010/0051681 A1 | 3/2010 | Nishida |

FOREIGN PATENT DOCUMENTS

| JP | 2007-004292 | 1/2007 |
| JP | 2007-200284 | 8/2007 |
| JP | 2010-052384 | 3/2010 |

* cited by examiner

*Primary Examiner* — Douglas Tran
(74) *Attorney, Agent, or Firm* — IPUSA, PLLC

(57) ABSTRACT

An image forming apparatus associating user identification information with printing jobs and carrying out the printing jobs previously stored, obtains specifying information that specifies the user identification information when a portable recording medium that stores the specifying information is set; requests an authentication part to authenticate the user by using the specifying information; permits logging in of the user when the user has been authenticated; obtains a job list of the printing jobs associated with the user identification information when the user has been authenticated; displays the job list on a display part; receives a selection of one or more printing jobs from the job list; causes printing data of the one or more printing jobs to be printed; and requests stopping of the printing when it is detected that the portable recording medium is unset.

8 Claims, 16 Drawing Sheets

FIG.8

| USER NAME | CARD ID | PASSWORD |
|---|---|---|
| ... | ... | ... |
| ... | ... | ... |
| ... | ... | ... |

23

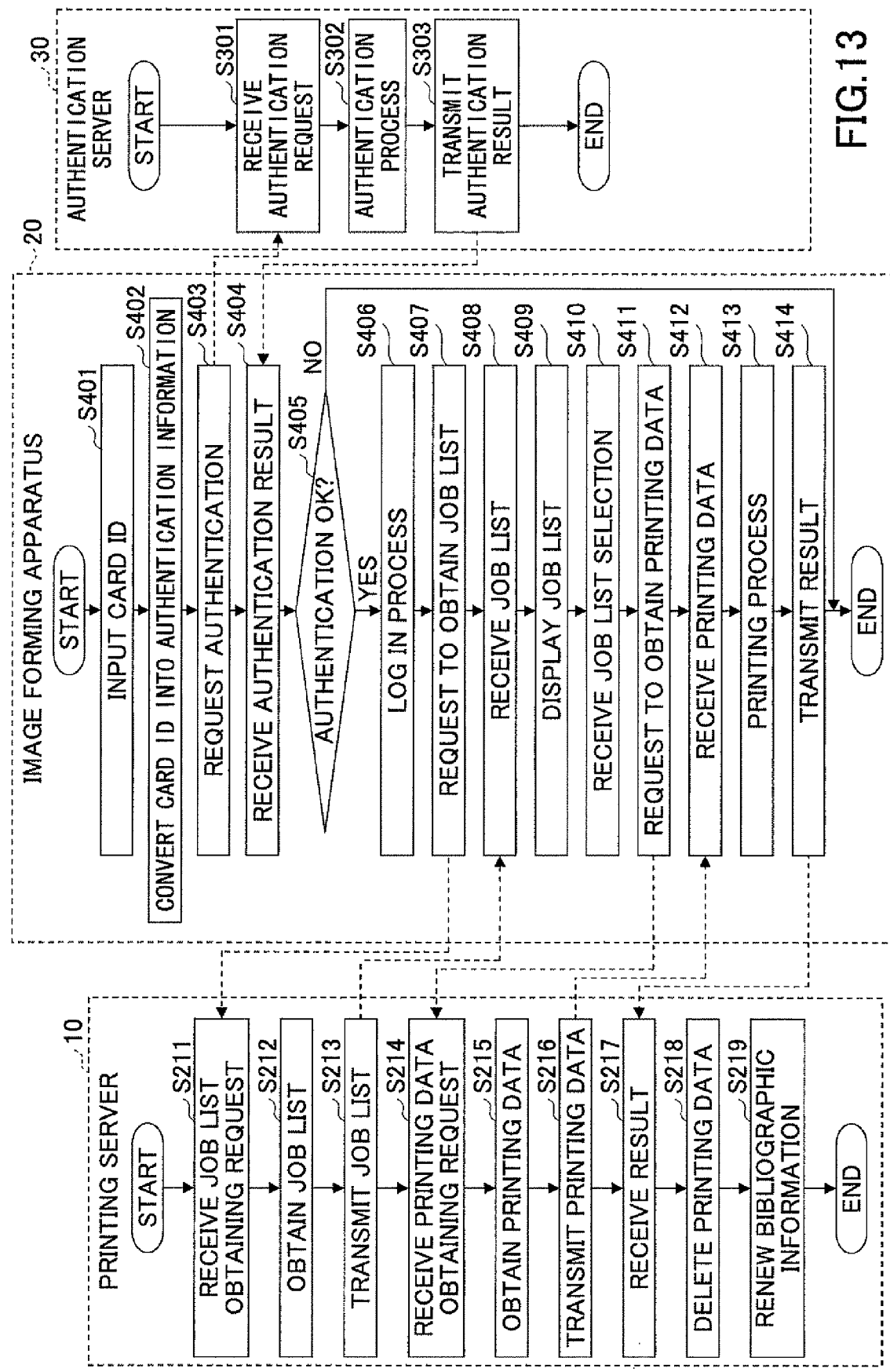

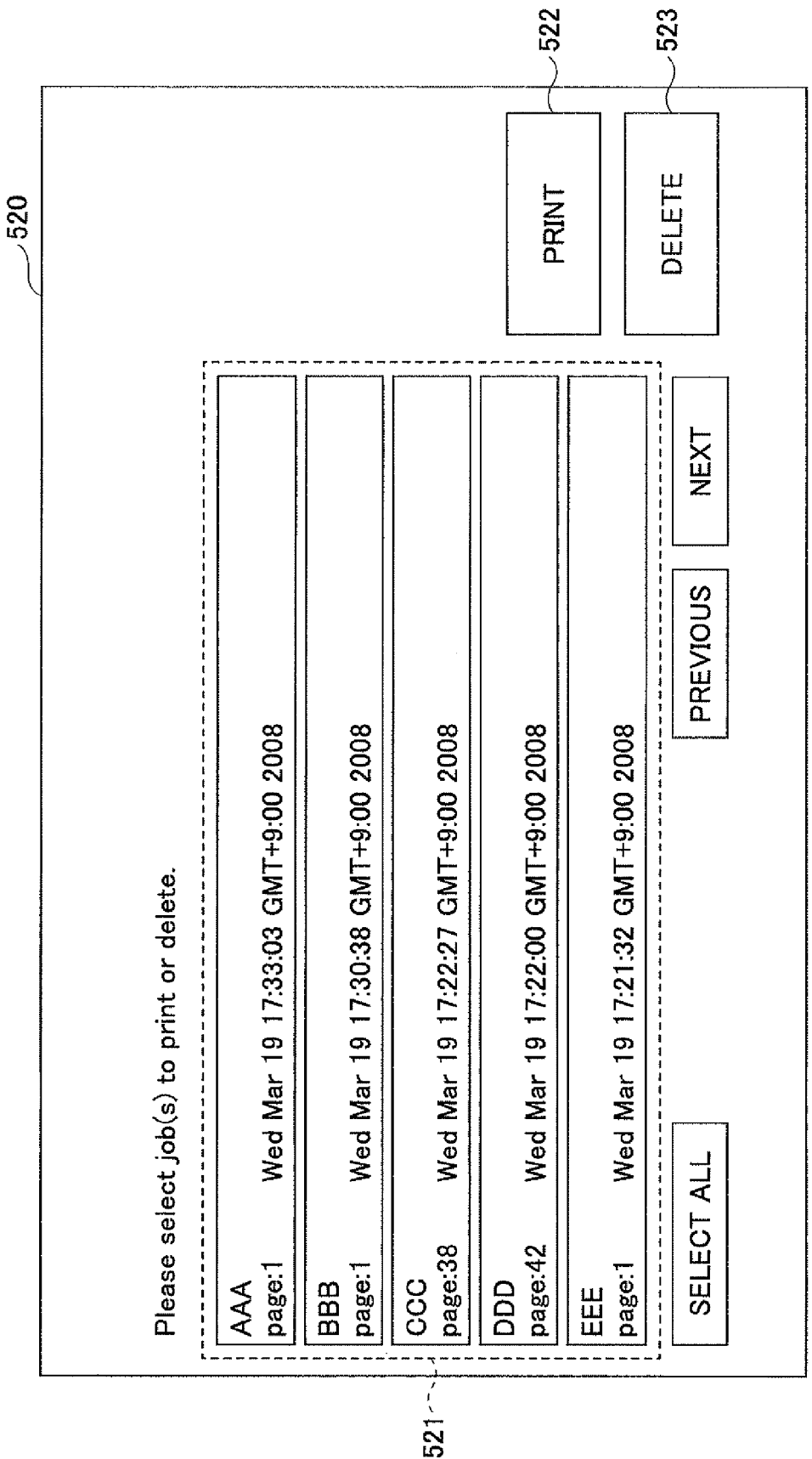

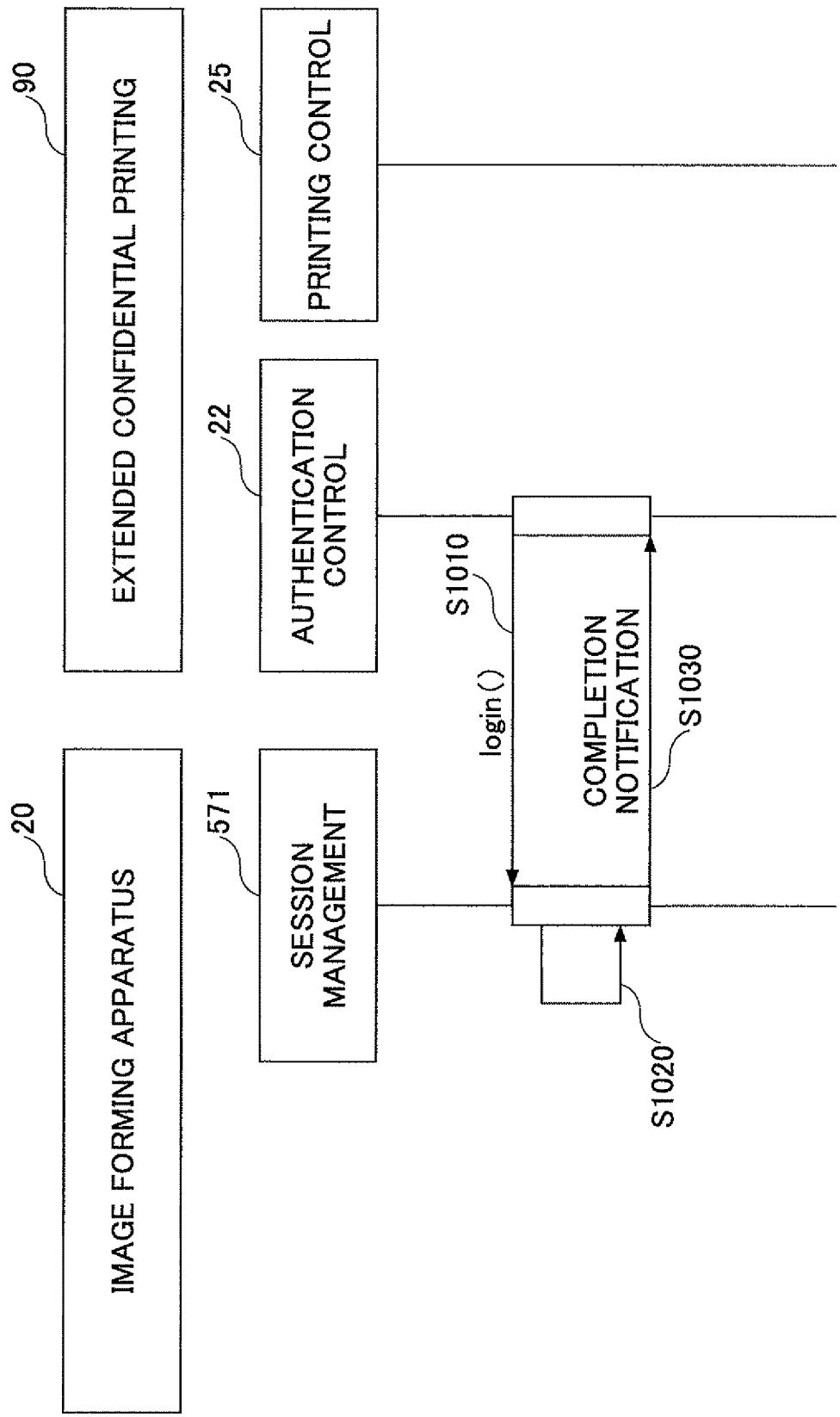

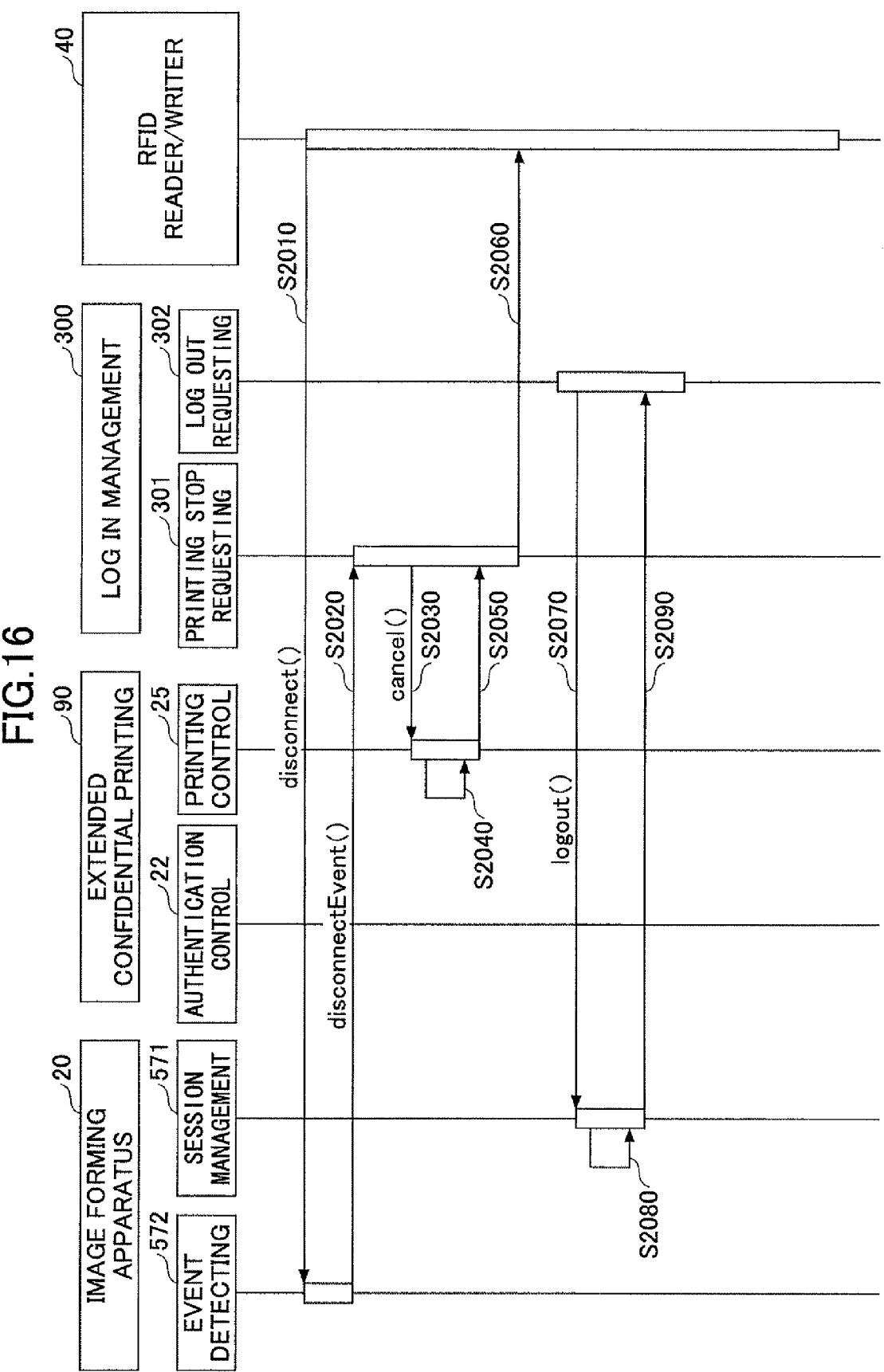

IMAGE FORMING APPARATUS, PRINTING JOB CARRYING OUT METHOD AND COMPUTER READABLE INFORMATION RECORDING MEDIUM

BACKGROUND OF THE INVENTION

1. Field of the Invention

The present invention relates to an image forming apparatus, a printing job carrying out method and a computer readable information recording medium that stores a program for carrying out, by the image forming apparatus, printing jobs previously stored in a server or a storing part of the image forming apparatus.

2. Description of the Related Art

An image forming apparatus is known which does not immediately print printing data received from a host computer, spools (i.e., stores) the printing data in a printing server or the image forming apparatus, and prints printing data selected from a list of the spooled printing data after a user logs in.

In such a printing system including the printing server, the user first inputs a printing instruction to a client PC (Personal Computer). The client PC transmits printing jobs corresponding to the input printing instruction to the printing server or the image forming apparatus. The printing server does not immediately transfer the printing jobs to the image forming apparatus, or the image forming apparatus does not immediately carry out the printing jobs, and stores the printing jobs in a storage such as a HDD (Hard Disk Drive). After that, the user operates the image forming apparatus, and inputs an instruction to carry out the stored printing jobs. The image forming apparatus obtains the printing jobs from the HDD or the printing server in response to the input instruction, and carries out the printing jobs (for example, see Japanese Laid-Open Patent Application No. 2007-200284 (Patent Document 1)).

In such a printing system, it is not preferable from a security viewpoint that another user carries out the printing jobs that have been stored by one user. Therefore, a process of authenticating a user may be carried out when the printing jobs are to be carried out in the image forming apparatus. For example, a user inputs his or her own authentication information when inputting an instruction to carry out the stored printing jobs. Then, in a case where authentication has succeeded based on the authentication information, carrying out of the printing jobs concerning the user is permitted. The user is thus allowed to store the printing jobs in the printing server without being aware of the specific image forming apparatus to be actually used.

Thus, the user can print only his or her own printing data, and therefore, it is possible to prevent his or her own printed papers from being taken by another user, or important printed papers from being read by another user.

However, there may be a case where, after the user logs in, and while the user is logged in, the user goes away from the image forming apparatus for greeting guests, for example. In a case where the user has used an IC (Integrated Circuit) card for the logging in, the user may hold the IC card and go away from the image forming apparatus for greeting guests. However, a logged out state does not occur just because the IC card is removed. Therefore, in order to prevent another person from carrying out the printing jobs, a predetermined operation has to be carried out. That is, for example, the printing has to be manually cancelled (stopped) and an operation of logging out has to be carried out. Therefore, the user may feel the operation of logging out as being troublesome, or may forget the operation of logging out. If so, another person may read the printed papers.

SUMMARY OF THE INVENTION

According to an embodiment of the present invention, an image forming apparatus that associates user identification information with printing jobs and carries out the printing jobs that have been previously stored in a server or a storing part, includes a specifying information obtaining part that obtains specifying information that specifies the user identification information when a portable recording medium that stores the specifying information is set; an authentication control part that requests an authentication part that authenticates a user to authenticate the user by using the specifying information; a log in permitting part that permits logging in of the user when the user has been authenticated; a job list obtaining part that obtains a job list of the printing jobs that have been associated with the user identification information from the server or the storing part when the user has been authenticated; a job displaying part that displays the job list on a display part; a selection receiving part that receives a selection of one or more printing jobs from the job list; a printing control part that causes printing data of the one or more printing jobs to be printed; and a printing stop requesting part that requests the printing control part to stop the printing when the specifying information obtaining part has detected that the portable recording medium is unset.

Other objects, features and advantages of the embodiment of the present invention will become more apparent from the following detailed description when read in conjunction with the accompanying drawings.

BRIEF DESCRIPTION OF THE DRAWINGS

FIG. 8 shows one example of corresponding information recorded in a corresponding information storing part;

FIG. 13 shows one example illustrating a procedure for when printing jobs are carried out;

FIG. 14 shows one example of a printing data list screen page;

FIG. 15 shows one example of a sequence diagram showing a procedure of a logging in process; and FIG. 16 shows one example of a sequence diagram showing a procedure for logging out of the image forming apparatus.

DETAILED DESCRIPTION OF THE EMBODIMENTS

An image forming apparatus, a printing job carrying out method and a computer readable information recording medium according to an embodiment of the present invention have been devised for the purpose that, after a user logs into the image forming apparatus by using information accompanying the user, printing in the image forming apparatus can be stopped only as a result of the user going away from the image forming apparatus.

Below, the embodiment of the present invention will be described with reference to the figures.

A printing system 1 in the embodiment will be generally described.

Figure 1:
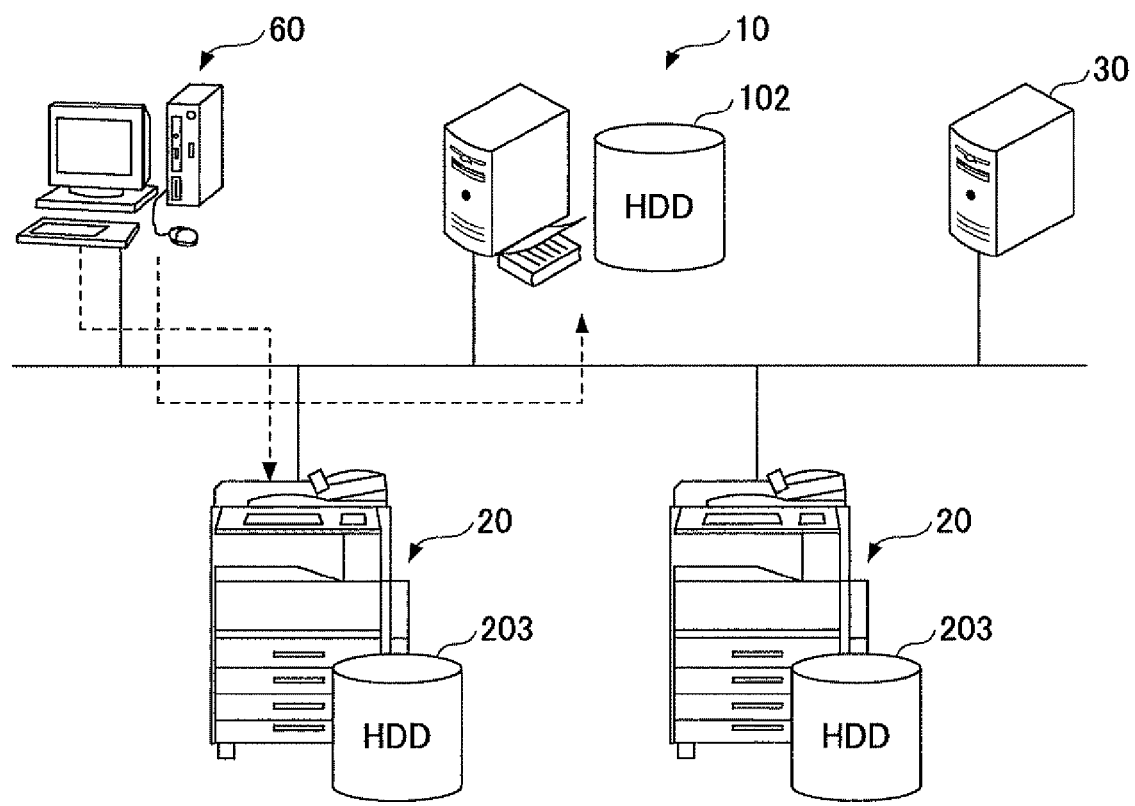
FIG. 1 illustrates storing printing jobs.
Figure 2:
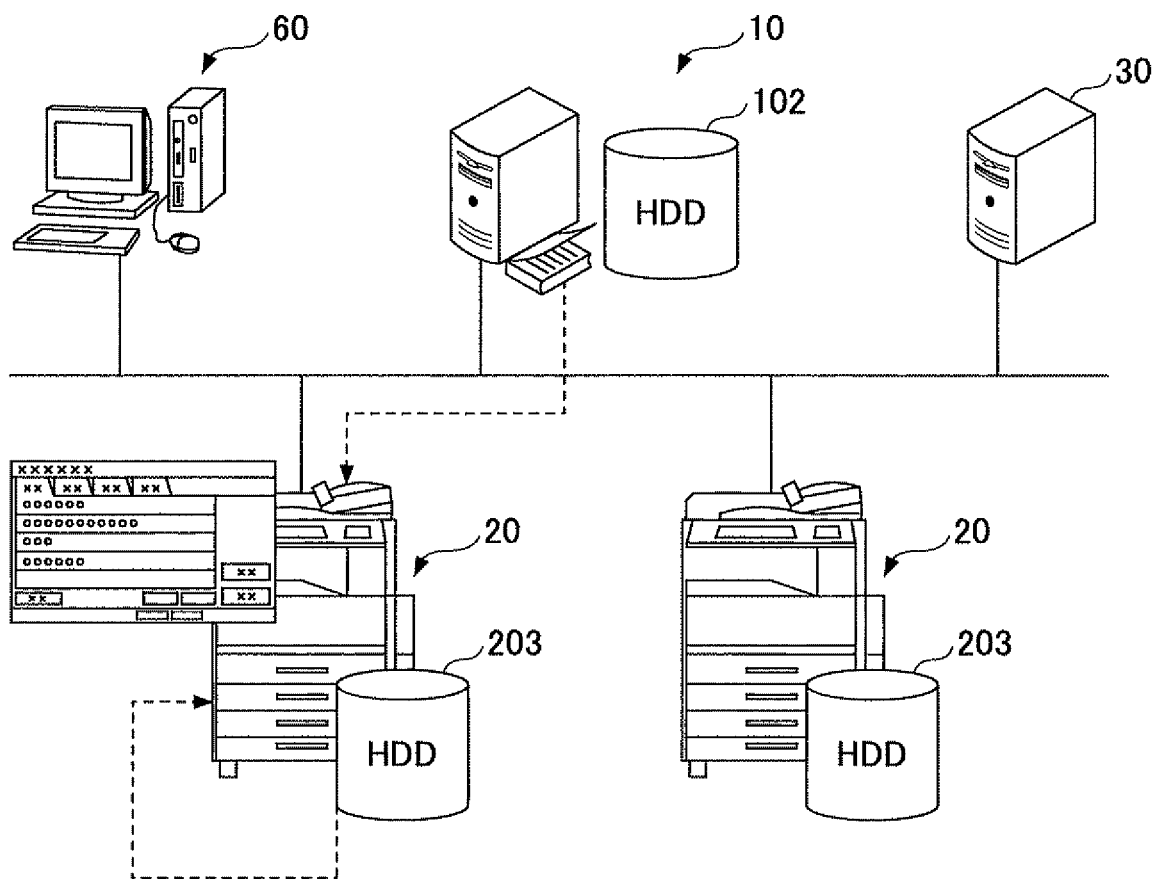
FIG. 2 illustrates carrying out the printing jobs.

FIGS. 1 and 2 show one example of a general configuration of the printing system 1. FIG. 1 illustrates storing printing jobs and FIG. 2 illustrates carrying out the printing jobs.

(1) First, a user stores printing jobs in an image forming apparatus 20 or a printing server 10 by operating a client PC 60.

(2) For starting printing, the user logs into the image forming apparatus 20 by using a card such as an IC card, and requests the printing server 10 or the image forming apparatus 20 to display a job list of the printing jobs that the user has registered. An extended confidential printing program provides a series of functions necessary at this time.

(3) The image forming apparatus 20 then displays the job list of the printing jobs on an operating panel.

(4) When the user is to go away from the image forming apparatus 20 in the logged in state, the user goes away from the image forming apparatus 20 together with the card while the logged in state of the image forming apparatus 20 is left unchanged.

(5) According to the embodiment, a program (referred to as an added program, hereinafter) is newly provided in the image forming apparatus 20 by which an event that the card becomes not detected by an RFID (Radio Frequency Identification) reader/writer is obtained. When the event that the card becomes not detected by an RFID reader/writer is thus obtained by the added program, the added program requests the extended confidential printing program to stop the printing. Thereby, the printing jobs are not carried out after the user goes away from the image forming apparatus 20 together with the card.

(6) Further, the added program requests the image forming apparatus 20 to generate the user's logged out state although the user does not actually carry out an operation to log out of the image forming apparatus 20. Thereby, it is possible that the image forming apparatus 20 generates the user's logged out state although the user does not actually carry out an operation to log out of the image forming apparatus 20, and to prevent another user from carrying out the printing that has been stopped by the added program as mentioned above.

[System Configuration]

Based on FIGS. 1 and 2, a system configuration and a procedure of an extended confidential printing function will be described. The printing system 1 includes the printing server 10, one or more image forming apparatuses 20, an authentication server 30 and one or more client PCs 60. All the apparatuses are connected together by means of a communication network such as a LAN (Local Area Network), a WAN (Wide Area Network) or the Internet. It is noted that the printing server 10 and/or the authentication server 30 may be plural printing servers 10 and/or plural authentication servers 30.

The one or more client PCs 60 (which may be generically referred to as a client PC 60, hereinafter) is a computer that generates data (document data, image data or such) to be printed by means of application software or such, and, in response to a user's input of a printing instruction, transmits the printing data to be printed, bibliographic conditions (including printing conditions) and a printing request to the printing server 20 or the one or more image forming apparatuses 20 (which may be generically referred to as an image forming apparatus 20, hereinafter) (hereinafter, it is assumed that a printing job includes the printing data, the bibliographic conditions and the printing request).

The user inputs authentication information (for example, a user name (or a user ID) and a password) when logging into the client PC 60 or inputting a printing instruction. The client PC 60 includes the authentication information in the printing job or adds the authentication information to the printing job.

The printing server 10 is a computer that stores the printing job received from the client PC 60 in a storage. In a case where the image forming apparatus 20 stores the printing job, the printing server 10 is not necessary. The printing server 10 or the image forming apparatus 20 requests the authentication server 30 to carry out an authentication process based on the authentication information received together with the printing job. The authentication server 30 is a computer that carries out the authentication process. The authentication server 30 and the printing server 10 are shared by the image forming apparatuses 20. The authentication server 30 and the printing server 10, or the authentication server 30 and the image forming apparatus 20 may be configured as being a single apparatus.

The authentication server 30 transmits an authentication result indicating whether user's authentication has succeeded to the printing server 10 or the image forming apparatus 20. The printing server 10 or the image forming apparatus 20 stores the received printing job when the authentication has succeeded.

The image forming apparatus 20 is a printer that, when the printing job is carried out, receives a user's operating instruction, obtains the printing job stored in the printing server 10 or the image forming apparatus 20 itself, and prints the printing data. It is noted that the image forming apparatus 20 is not limited to the printer, and, may be an MFP (Multifunction Peripheral) that includes one or more functions of a printer function, a scanner function and a facsimile function.

A user who uses the image forming apparatus 20 inputs the authentication information from the card when logging into the image forming apparatus 20. The image forming apparatus 20 transmits the authentication information input by the user to the authentication server 30 via the printing server 10 or directly. The authentication server 30 transmits the authentication result indicating whether the user's authentication has succeeded to the printing server 10 or the image forming apparatus 20.

The image forming apparatus 20 displays a list of printing jobs associated with the user name in a case where the authentication has succeeded. The image forming apparatus 20 then receives a printing job selected by the user from the displayed list, obtains the printing job from the HDD of the printing server 10 or the image forming apparatus 20 itself, and carries out printing.

[Hardware Configuration]

Figure 3:
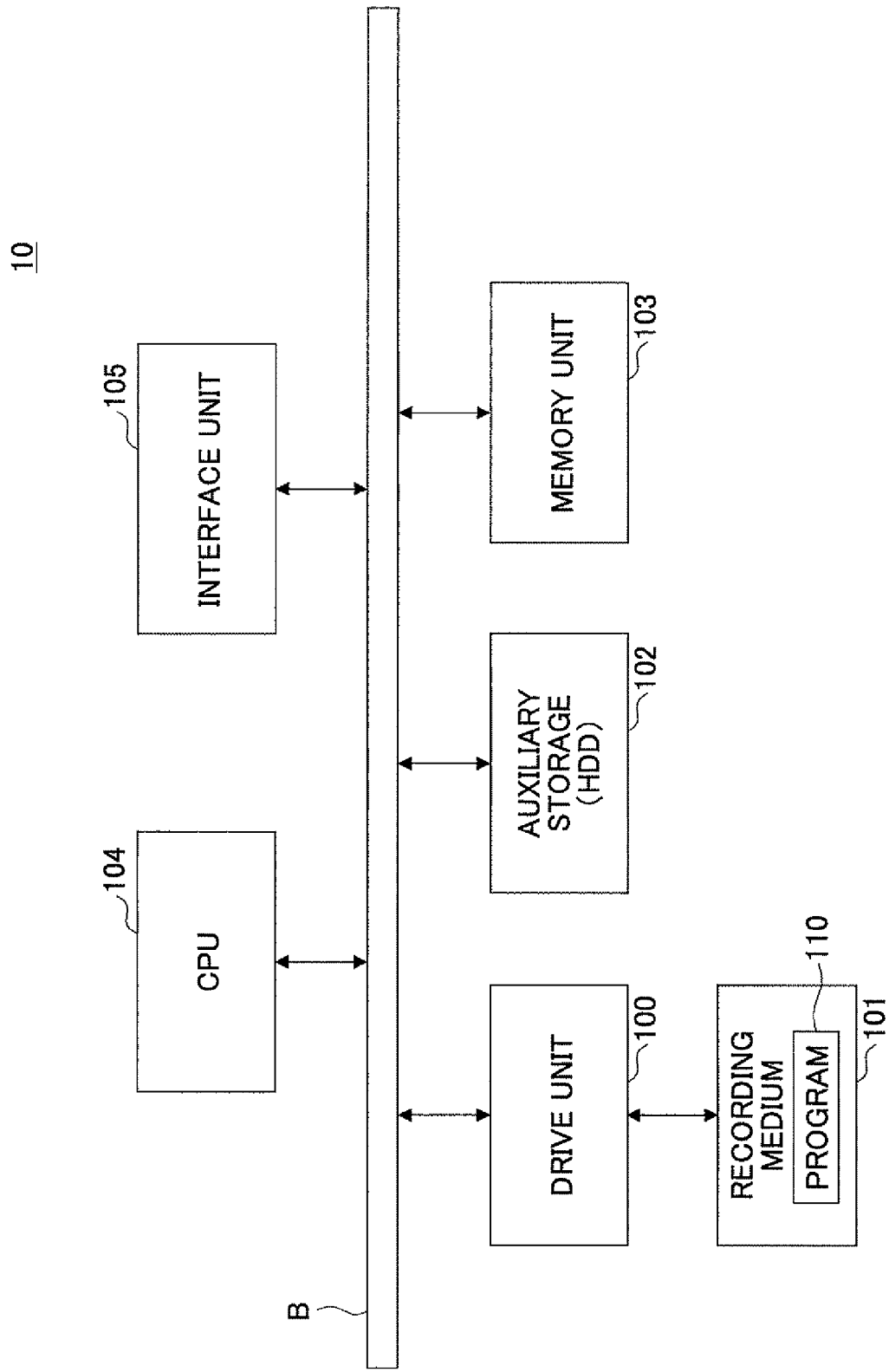
FIG. 3 shows one example of a hardware configuration of a printing server.

FIG. 3 shows one example of a hardware configuration of the printing server 10 according to the embodiment. The printing server 10 includes a drive unit 100, an auxiliary storage 102, a memory unit 103, a CPU 104 and an interface unit 105, which are mutually connected by a bus B.

A program 110 that realizes processes carried out by the printing server 10 is provided by means of a recording medium 101 such as a CD-ROM (Compact Disk Read Only Memory). When the recording medium 101 storing the program 110 is set in the drive unit 100, the program 110 is installed in the auxiliary storage 102 from the recording medium 101 via the drive unit 100. However, the program 110 may be delivered as a result of a computer (not shown) downloading the program 110 instead of being delivered by means of the recording medium 101.

The auxiliary storage 102 stores the installed program 110, and also, stores necessary files, data and so forth. The auxiliary storage 102 is a non-volatile memory such as a HDD (Hard Disk Drive) or a SSD (Solid State Drive).

In response to a starting-up instruction of the program 110, the CPU 104 reads the program 110 from the auxiliary storage 102 and stores the program 110 in the memory unit 103. The memory unit 103 is, for example, a DIMM (Dual Inline Memory Module), SO-DIMM (Small Online Dual Inline Memory Module) or such. The CPU 104 executes the program 110 stored in the memory unit 103 and carries out functions of the printing server 10 according to the program 110. The interface unit 105 is a network card of an interface (for example, Ethernet (registered trademark)) for connecting the printing server 10 with the communication network.

Figure 4:
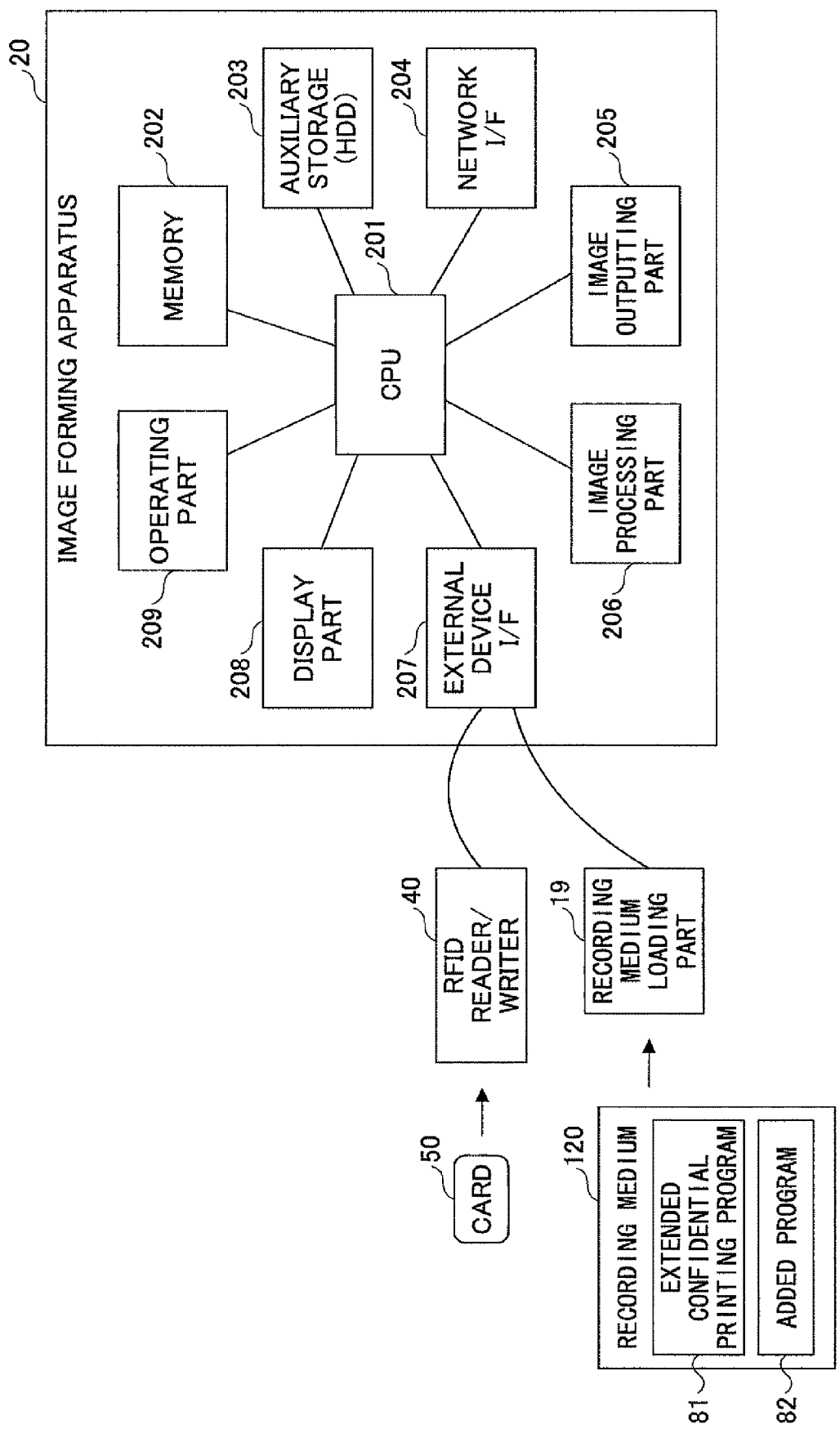
FIG. 4 shows one example of a hardware configuration of an image forming apparatus.

FIG. 4 shows one example of a hardware configuration of the image forming apparatus 20. The image forming apparatus 20 includes a CPU 201, a memory 202, an auxiliary storage 203, a network I/F 204, an image outputting part 205, an image processing part 206, an external device I/F 207, a display part 208 and an operating part 209.

There are a first case where an extended confidential printing program 81 that realizes the function of extended confidential printing in the image forming apparatus 20 is executed when loaded in the memory unit 103 directly from the recording medium 120, and a second case where the extended confidential printing program 81 is executed when loaded in the memory unit 103 after being stored (installed) in the auxiliary storage 203 that is a non-volatile storage such as a HDD. The auxiliary storage 203 stores the installed extended confidential printing program 81, and also, stores necessary files, font data, image data and so forth. In response to a starting-up instruction for the extended confidential printing program 81, the CPU 201 reads the extended confidential printing program 81 from the recording medium 120 or the auxiliary storage 203, and stores the read extended confidential printing program in the memory 202.

The CPU 201 executes the extended confidential printing program 81 stored in the memory 202, and realizes the function concerning the image forming apparatus 20 according to the extended confidential printing program 81. The network I/F 204 is used as an interface for connecting the image forming apparatus 20 with the communication network.

The display part 208 includes a LCD (Liquid Crystal Display) or such, and displays an operating screen page, a message and so forth. The operating part 209 includes buttons (keys) of hardware, and receives user's operating input. Further, the display part 208 has a touch panel, and the display part 208 and the operating part 209 are configured as one unit as an operating panel.

The image processing part 206 carries out various image processing processes necessary for outputting (printing) image data and so forth. The image outputting part 205 outputs (prints) the image data.

The external device I/F 207 is an interface for connecting the image forming apparatus 20 with, for example, a RFID reader/writer 40 that is used by a user to input the authentication information, and, for example, includes a USB port (USB host interface), a serial port, or such. The RFID reader/writer 40 is a so-called card reader that reads information from a card 50, and includes a hardware interface (for example, a USB connector, a serial interface, or such) that is connectable with the external device I/F 207. However, the RFID reader/writer 40 may be built into the image forming apparatus 20. The RFID reader/writer 40 may be of either a contact type or a non-contact type. The card 50 is not limited to an IC card, and may be a magnetic card or such, as long as at least a unique card ID (card number) can be recorded in the card. The card ID is generally called a Universal ID or Card Serial Number. Specific examples of the card 50 include a Proximity card, a Mifare card, Java (registered trademark) Card, and so forth.

In the embodiment, it is assumed that respective one of the cards 50 is delivered to each user. However, depending on a security level necessary for operating the printing system 1, a single one of the cards 50 may be shared by plural users. It is noted that it is not necessary that the card 50 delivered to each user be limited to a single type. As mentioned above, the RFID reader/writer 40 is connectable with the image forming apparatus 20 easily by using the USB or such. Therefore, plural RFID reader/writers 40 may be connected with the image forming apparatus 20 at the same time, for connecting with various types (Proximity card, Mifare card, Java (registered trademark) Card and so forth) of the card 50. In this case, the plural types of cards 50 may be used at the same time.

Further, a recording medium loading part 19 is connected to the external device I/F 207. The recording medium loading part 19 is used to load a recording medium 120, reads data stored in the recording medium 120, and transmits the read data to the CPU 201 or the memory 202. The recording medium 120 is, for example, a USB memory, a SD (Secure Digital) card, a CD-ROM, or such.

The recording medium 120 stores the extended confidential printing program 81 and an added program 82. When a user loads the recording medium 120 in the recording medium loading part 19, the CPU 201 receives an interrupt or the CPU 201 responds to the user's operating input, for example, to execute the extended confidential printing program 81 and the added program 82 stored in the recording medium 120. The image forming apparatus 20 provides the above-mentioned function (extended confidential printing) as a result of the CPU 201 executing the extended confidential printing program 81. Further, as a result of the CPU 201 executing the added program 82, the image forming apparatus 20 provides the function of automatically causing the user's logged out state when the user goes away from the image forming apparatus 20 together with the card 50. It is noted that the card 50 and the recording medium 120 may be combined into one unit, and the card 50 may store the extended confidential printing program 81 and the added program 82.

[Software Configuration]

Mounting of the extended confidential printing program 81 and the added program 82 will be described.

Figure 5:
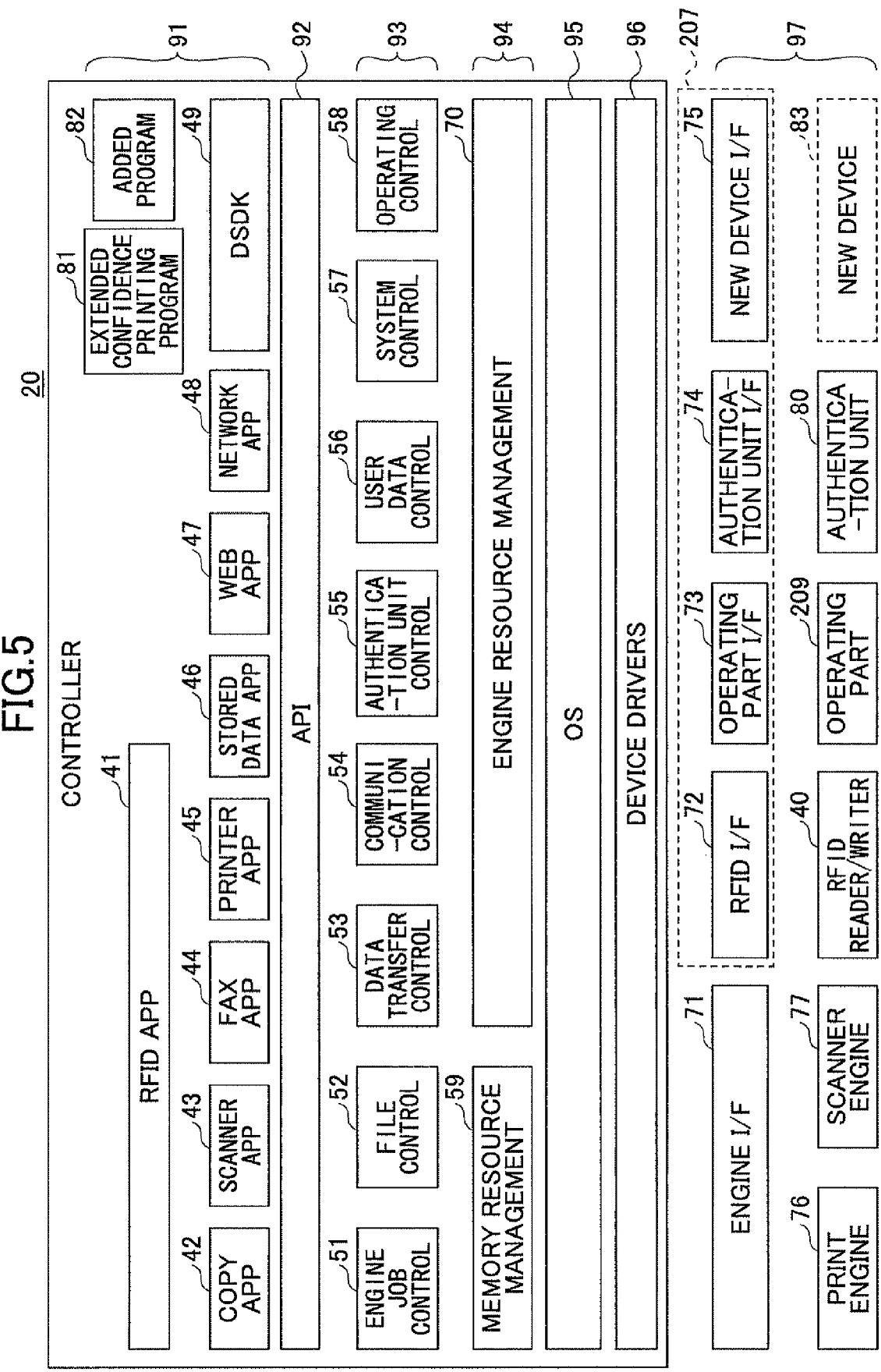
FIG. 5 shows one example of a software configuration of the image forming apparatus.

FIG. 5 shows one example of software in the image forming apparatus 20. The image forming apparatus 20 has an application group 91, an API 92, a control function group 93, a resource management part 94, an OS (Operating System) 95, device drivers 96 and hardware resources 97.

The application group 91 includes a RFID application 41, a copy application 42, a scanner application 43, a FAX (facsimile) application 44, a printer application 45, a stored data application 46, a Web application 47, a network application 48 and a DSDK (Device Software Development Kit) 49. These applications realize corresponding various functions.

The RFID application 41 reads information from the card 50, and writes information to the card 50. The stored data application 46 provides functions of reading and selecting image data or printing data stored in the auxiliary storage 203. The Web application 47 provides a function as a browser to access a Web server (not shown) and display, on the LCD, various information items stored in the Web server. The network application 48 provides a communication function with the Web server and other PCs connected via the communication network.

The DSDK 49 means an environment of "Device Software Development Kit" using J2ME (Java 2 Micro Edition) that is Java (registered trademark) for embedded devices. Specifically, as a Java (registered trademark) VM (Virtual Machine), the DSDK 49 is an environment (virtual machine) in which an application operates without depending on hardware or software. The extended confidential printing program 81 that realizes an extended confidential printing part 90 (see FIG. 7) is a DSDK application that operates in the DSDK 49. Therefore, the extended confidential printing program 81 is written in such a programming language that the extended confidential printing program 81 can be executed without depending on specific hardware or software.

The control function group 93 includes an engine job control part 51, a file control part 52, a data transfer control part 53, a communication control part 54, an authentication control part 55, a user data control part 56, a system control part 57 and an operating control part 58. The engine job control part 51 controls a print engine 76 and a scanner engine 77 which are connected via an engine I/F 71. The file control part 52 controls renewing, deleting, moving and so forth of various files stored in the auxiliary storage 203. The data transfer control part 53 controls delivering document data stored in the auxiliary storage 203. The communication control part 54 controls communication via the network I/F 204. The authentication control part 55 controls an authentication unit 80 via an authentication unit I/F 74. The user data control part 56 manages user information. The system control part 57 carries out application control, session management, system screen page displaying, LED displaying, resource management, application control by interrupt, and so forth. The operating control part 58 controls the operating part 209 that acts as an information transfer part between a user and image forming apparatus body control.

A memory resource management part 59 monitors a usage condition of the memory 202, and carries out releasing or ensuring the memory 202. An engine resource management part 70 controls the system of the image forming apparatus 20 and manages the hardware resource 97 together with the system control part 57.

The operating control part 58 obtains from the operating part 209 a key pressing operation or a key touching operation as a key event, and transmits a key event function corresponding to the obtained key to the system control part 57. Further, the system control part 57 calls an image drawing function in response to a request by the application group 91 or the control function group 93, and draws and outputs various screen pages on the operating part 209.

Further, the system control part 57 detects interrupts generated from the hardware resources 97 via the device driver 96, for example. The device driver 96 transmits an event function corresponding to a type of the interrupt to the system control part 57. The system control part 57 calls an image drawing function corresponding to the event function, draws a screen page on the operating part 209, or calls the application group 91 according to the event function.

The application group 91 requests the control function group 93 to provide a function via the API 92. The control function group 93 interprets the request from the application group 91, and generates an acquisition request for the hardware resources 97. The memory resource management part 59 or the engine resource management part 70 arbitrates the acquisition request. It is noted that the OS (for example, LINUX (registered trademark)) 95 regards respective pieces of software of the application group 91, the control function group 93 and the resource management part 94 as processes, and executes them in parallel.

Further, the device driver 96 uses the engine I/F 71, an RFID I/F 72, an operating part I/F 73, the authentication unit I/F 74 and a new device I/F 75, and requests the hardware resource 97 for carrying out processes. It is noted that the RFID reader/writer 40 reads information from the card 50 with or without coming into contact with the card 50. The authentication unit 80 obtains hardware keys for inputting a password or biometric information. The new device I/F 75 is, for example, a USB interface for connecting with various new devices 83 having USB interfaces, and thus enables using functions of the new devices 83. By such a configuration, the image forming apparatus 20 can unitarily carry out processes that are necessary for the respective applications in common by means of the processes of the control function group 93 and those provided below the control function group 93 in FIG. 5.

Next, the added program 82 will be described.

Figure 6:
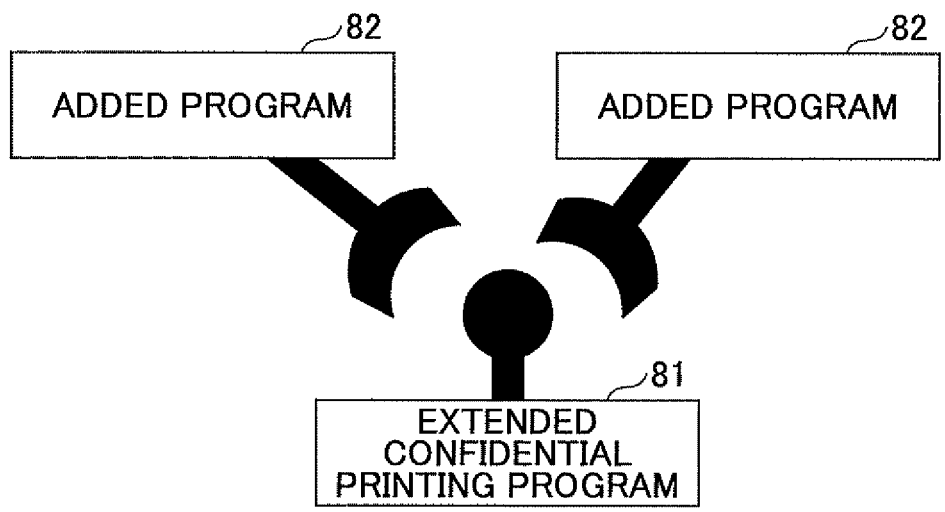
FIG. 6 illustrates a relationship between an added program and an extended confidential printing program.

FIG. 6 illustrates a relationship between the added program 82 and the extended confidential printing program 81. The added program 82 is independent from the extended confidential printing program 81. The added program 82 may be plural added programs 82, and therefore, FIG. 6 shows the two added programs 82. The added program 82 operates in the DSDK 49 the same as the extended confidential printing program 81, and is a DSDK application that is written in such a programming language that the added program 82 can be executed without depending on specific hardware or software.

The added program 82 can control the extended confidential printing program 81. A protrusion extending upward from the extended confidential printing program 81 shown in FIG. 6 diagrammatically shows a control lever, and a protrusion extending downward from each added program 82 diagrammatically shows a control arm for operating the control lever. The system control part 57 detects a hardware interrupt from the RFID reader/writer 40, and notifies the added program 82 of a corresponding event. Specifically, the system control part 57 calls the added program 82 itself, or a function of the added program 82, which function corresponds to unsetting of the card 50. The added program 82 controls the extended confidential printing program 81 according to the called function. Specifically, the added program 82 calls a function of the extended confidential printing program 81. Thereby, the added program 82 can control execution of the extended confidential printing program 81.

Therefore, by adding the added program 82, it is possible to obtain various events generated in the image forming apparatus 20, and control the extended confidential printing part 90 for starting, stopping or such of a printing operation according to the obtained events, without changing anything in the existing extended confidential printing program 81.

[Function of Printing System 1]

Figure 7:
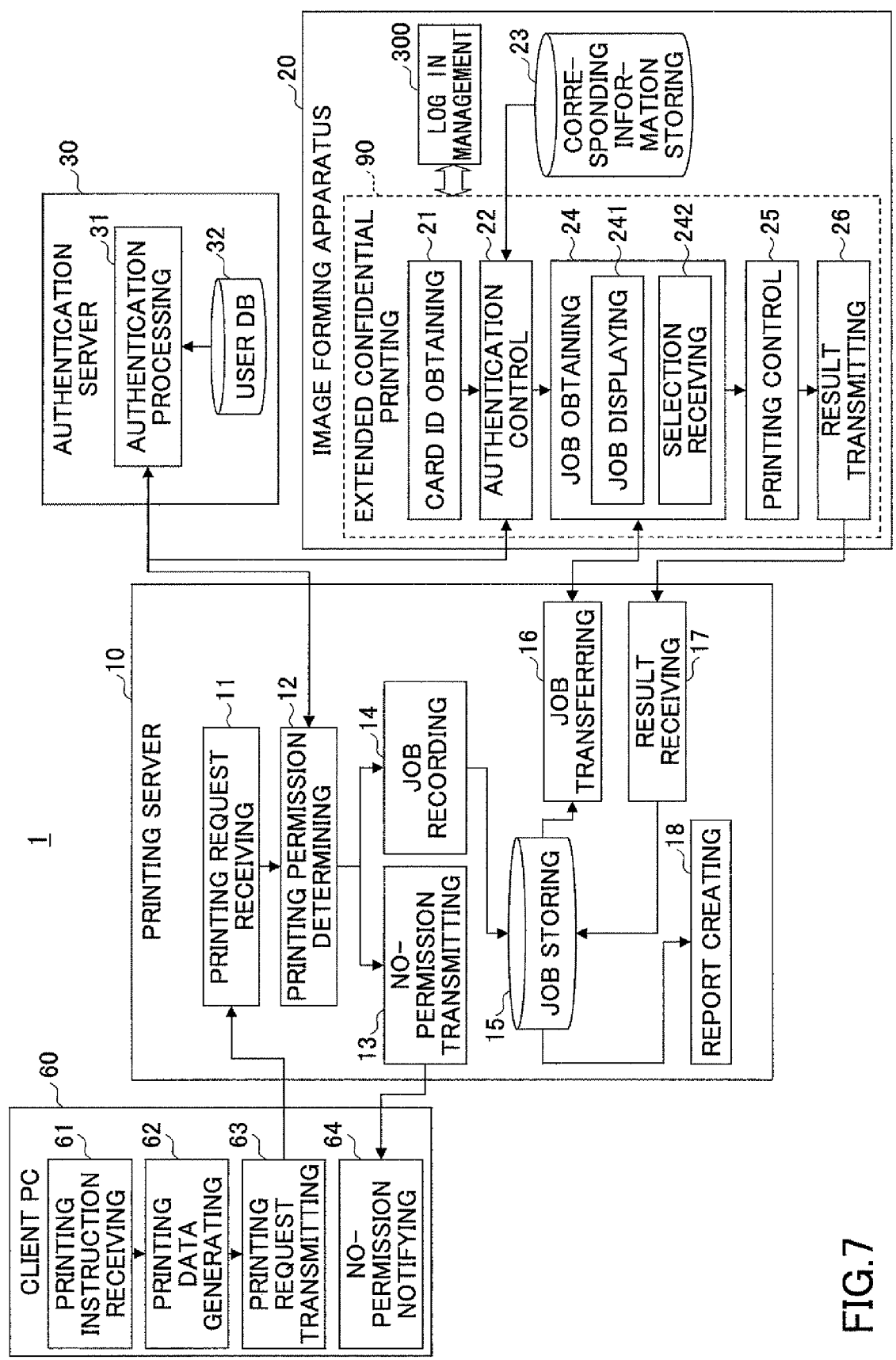
FIG. 7 shows one example of a functional block diagram of a printing system.

FIG. 7 shows one example of a functional block diagram of the printing system 1. The functional block diagram of FIG. 7 shows a mode in which the printing server 10 is included. It is noted that a functional block diagram including the added program 82 will be described later.

The client PC 60 includes a printing instruction receiving part 61, a printing data generating part 62, a printing request transmitting part 63 and a no-permission notifying part 64. These respective parts are realized by processes that are carried out by a CPU (not shown) of the client PC 60 as a result of a program installed in the client PC 60 being executed by the CPU of the client PC 60.

The printing instruction receiving part 61 receives a designation of document data to be printed. Further, the printing instruction receiving part 61 causes a display part (not shown) of the client PC 60 to display a screen page (referred to as "printing setting screen page", hereinafter) for urging a user to set printing attribute information (also referred to as printing conditions or printing setting items), and receives, from the printing setting screen page, a setting of the printing attribute information and an input of a printing instruction. Further, the printing instruction receiving part 61 receives, from the printing setting screen page, an input of the user's authentication information. The authentication information is to be information corresponding to an authentication system in the authentication server 30. In the embodiment, it is assumed that the authentication information is a user name and a password.

The printing data generating part 62 generates printing data from the document data to be printed based on the printing attribute information. The printing data is data described by PDL (Page Description Language), and includes the printing attribute information. Further, the printing data generating part 62 includes the authentication information that has been input by the user and received by the printing instruction receiving part 61 in the printing data, or attaches the authentication information to the printing data. The printing request transmitting part 63 transmits a printing job that includes the printing data, the printing attribute information, the printing request and the authentication information to the printing server 10. The no-permission notifying part 64 carries out a process of notifying the user that carrying out of the printing job has not been permitted (or the printing job cannot be carried out), based on an authentication result that has resulted based on the printing job and has been transmitted from the printing server 10.

It is noted that the printing instruction receiving part 61 and the printing data generating part 62 are realized by a printer driver, for example. The printer driver may be one installed in the client PC 60, or may be one installed in another computer such as the printing server 10. In the latter case, a mechanism that is used for sharing a printer and is provided by an OS may be used.

The printing server 10 includes a printing request receiving part 11, a printing permission determining part 12, a no-permission transmitting part 13, a job recording part 14, a job storing part 15, a job transferring part 16, a result receiving part 17 and a report creating part 18. These respective parts are realized by processes that are carried out by the CPU 104 as a result of a program installed in the printing server 20 being executed by the CPU 104.

The printing request receiving part 11 receives the printing job transmitted by the client PC 60. The printing permission determining part 12 determines whether to permit printing based on the authentication information extracted from the printing job. Specifically, the printing permission determining part 12 transmits the authentication information to the authentication server 30, and causes the authentication server 30 to carry out authentication based on the authentication information. In a case where the authentication has failed, the printing permission determining part 12 determines that the printing is not permitted. In a case where the authentication has succeeded, the printing permission determining part 12 determines that the printing is permitted. The no-permission transmitting part 13 transmits a determination result that the printing is not permitted by the printing permission determining part 12 to the client PC 60. The client PC 60 to which the determination result is to be transmitted is determined based on identification information (IP address or such) included in the authentication request.

In a case where the printing permission determining part 12 has determined to permit the printing, the job recording part 14 generates a job ID for the printing job, and records, in the job storing part 15, the printing data and the printing attribute information included in the printing job, as being associated with the job ID. Further, the job recording part 14 extracts part or all of the printing attribute information from the printing job, and records, in the job storing part 15, the thus-extracted information as bibliographic information of the printing job as being associated with the job ID. For example, the bibliographic information includes the printing conditions (file name, stored date and time, whether the printing is color printing or monochrome printing, paper size, and so, forth), a user name and the number of pages to print. The job storing part 15 is realized by a storage area (for example, a table, a folder or such) in the auxiliary storage 102 for storing printing jobs (printing data, bibliographic information and so forth).

The job transferring part 16 responds to the request of the image forming apparatus 20 and transfers the printing job stored (recorded) in the job storing part 15 to the image forming apparatus 20. It is noted that the job transferring part 16 can selectively read information from the job storing part 15 so as to transmit only the bibliographic information, only the printing data, only the bibliographic data and the printing data, or so.

The result receiving part 17 receives a carrying out result of the printing job (information indicating whether the printing job has been finished successfully) from the image forming apparatus 20, and deletes the corresponding printing job stored in the job storing part 15. The report creating part 18 creates information (report) indicating, for example, a usage condition for each user (by collecting the respective usage conditions) based on the bibliographic information stored in the job storing part 15.

The image forming apparatus 20 includes the extended confidential printing part 90, a log in management part 300 and a corresponding information storing part 23. The extended confidential printing part 90 includes a card ID obtaining part 21, an authentication control part 22, a job obtaining part 24, a printing control part 25 and a result transmitting part 26. The extended confidential printing part 90 is realized as a result of the CPU 201 executing the extended confidential printing program 81 stored in the recording medium 120. It is noted that a manager (person) may previously install the extended confidential printing program in the image forming apparatus 20, or, the image forming apparatus 20 may copy the extended confidential printing program 81 from the recording medium 120 to the auxiliary storage 203.

Further, the log in management part 300 is realized as a result of the CPU 201 of the image forming apparatus 20 executing the added program 82. The log in management part 300 will be described later.

The card ID obtaining part 21 obtains the card ID from the RFID reader/writer 40, which card ID has been read by the RFID reader/writer 40 from the card 50. The authentication control part 22 obtains the user name and password corresponding to the card ID from the corresponding information storing part 23, and causes the authentication server 30 to carry out authentication based on the obtained user name and password.

Figure 8:
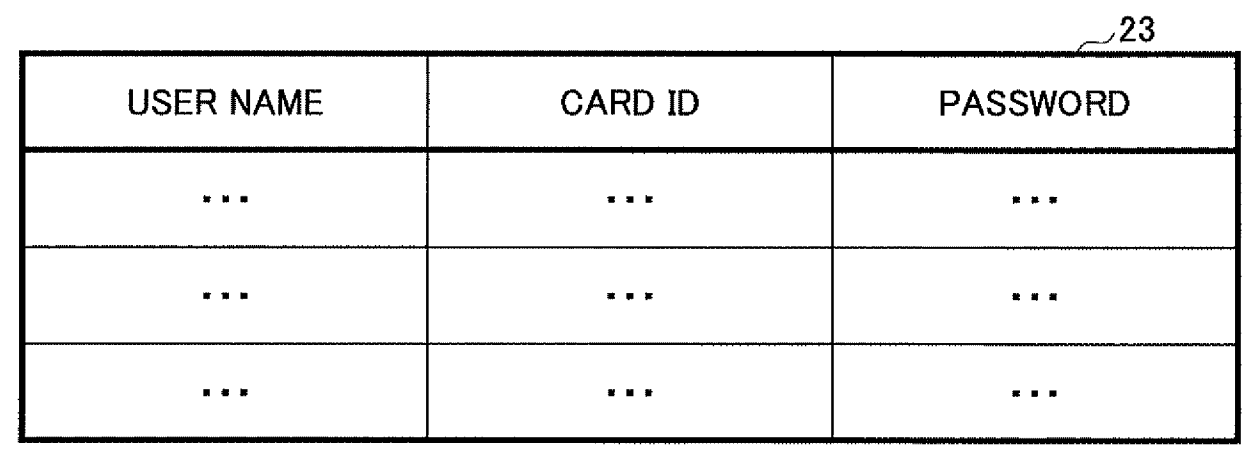

The corresponding information storing part 23 is a storage area (for example, a table) in the auxiliary storage 203 for storing corresponding information between the card ID, the user name and the password. FIG. 8 shows one example of the corresponding information stored in the corresponding information storing part 23. As shown in FIG. 8, in the corresponding information storing part 23, for each user, the user name, the card ID and the password are stored as being associated with each other. Accordingly, the authentication control part 22 obtains the user name and password that are associated with the card ID from the corresponding information storing part 23, and thus, converts the card ID into the user name and password.

The job obtaining part 24 obtains the printing jobs that have been obtained by the printing server 10. A job displaying part 241 displays, on the display part 208, a job list of the printing jobs that have been obtained by the job obtaining part 24. A selection receiving part 242 receives the printing job selected by the user. The printing control part 25 causes the image outputting part 205 to carry out the printing jobs obtained by the job obtaining part 24. The result transmitting part 26 transmits the carrying out results of the printing jobs to the printing server 10.

The authentication server 30 includes an authentication processing part 31 and a user DB 32. These respective parts are realized by processes carried out by a CPU (not shown) of the authentication server 30 as a result of the CPU executing a program installed in the authentication server 30. The authentication processing part 31 responds to the authentication request from the printing server 10 or the image forming apparatus 20, and carries out an authentication process by using the authentication information previously registered in the user DB 32 for each user. The user DB 32 is a database in which the authentication information is stored for each user. The user DB 32 may store, other than the authentication information, attribute information of the users. For example, authority information for a function of the image forming apparatus 20 and so forth may be stored for each user in the user DB 32.

Figure 9:
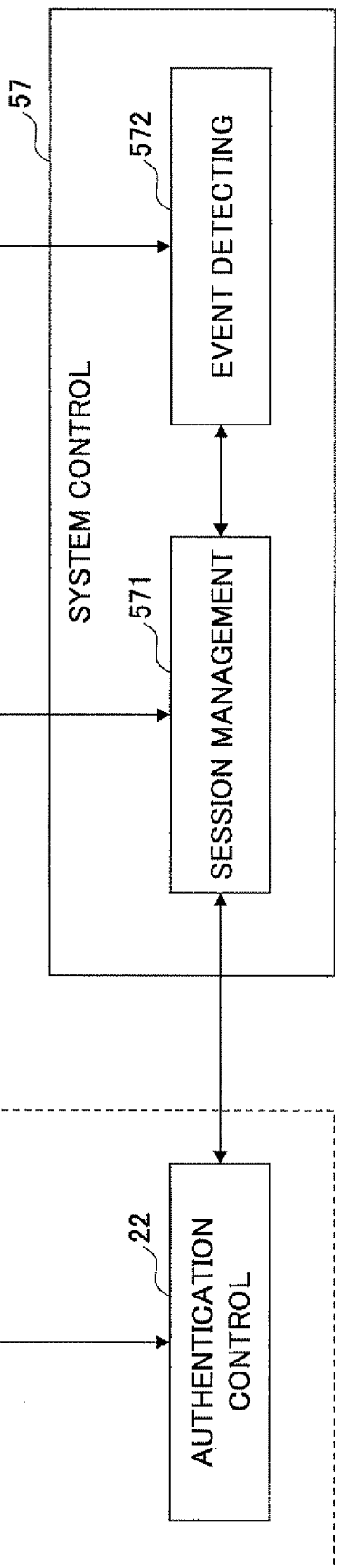
FIG. 9 shows one example illustrating a log in management part and an extended confidential printing part.

FIG. 9 shows one example illustrating the log in management part 300 and the extended confidential printing part 90. In FIG. 9, for the sake of explanation, functions that are mainly used are shown.

In the embodiment, it is assumed that the system control part 57 manages logging in and logging out. Management of logging in and logging out is to be carried out by the side of the system of the image forming apparatus 20 (for example, the function control group 93), and the system control part 57 is merely one example. The system control part 57 includes a session management part 571 and an event detecting part 572. The session management part 571 manages processes for a user as being associated with a session ID after the user logs in until the user logs out. When the user logs in, the session management part 571 generates a unique session ID, and registers, in a session table, the user's user name, password, card ID, logged in time and so forth, as being associated with the session ID. Further, when the user logs out, the session management part 571 registers the logged out time and so forth in the session table, and invalidates the corresponding session ID. To invalidate means to prevent processes for the user based on the session ID from being accepted, and, for example, invalidating is realized as a result of a flag bit that indicates that the user has logged out being set in the session table.

In the embodiment, "the user's logging in" is realized as a result of the authentication control part 22 receiving the authentication result that the authentication has succeeded from the authentication server 30, and then, the system control part 57 carrying out a logging in process. Further, "the user's logging out" is realized (or the user's logged out state is generated) as a result of the corresponding session ID being invalidated. Generally, as a result of the user manually inputting an operation of logging out from a predetermined screen page displayed on the operating part 209, the session management part 571 invalidates the session ID. In the embodiment, as a result of a log out requesting part 302 requesting the session management part 571 to generate the user's logged out state, the session ID can be invalidated. It is noted that the above-mentioned processes of logging in and logging out are merely examples, and the image forming apparatus 20 may carry out preferred and appropriate ones of the logging in and logging out processes.

Further, the event detecting part 572 detects hardware interrupts such as a state of the card 50 becoming unset in the RFID reader/writer 40, and notifies the added program 82 of an event of the card 50 having become unset.

Further, the log in management part 300 includes a printing stop requesting part 301 and the log out requesting part 302. The printing stop requesting part 301 requests the printing control part 25 to stop printing. Further, when receiving a notification of an event of the card 50 having becomes unset from the event detecting part 572, the log out requesting part 302 requests the session management part 571 to generate a logged out state for the user who is currently logged in (invalidate the session ID).

Figure 10:
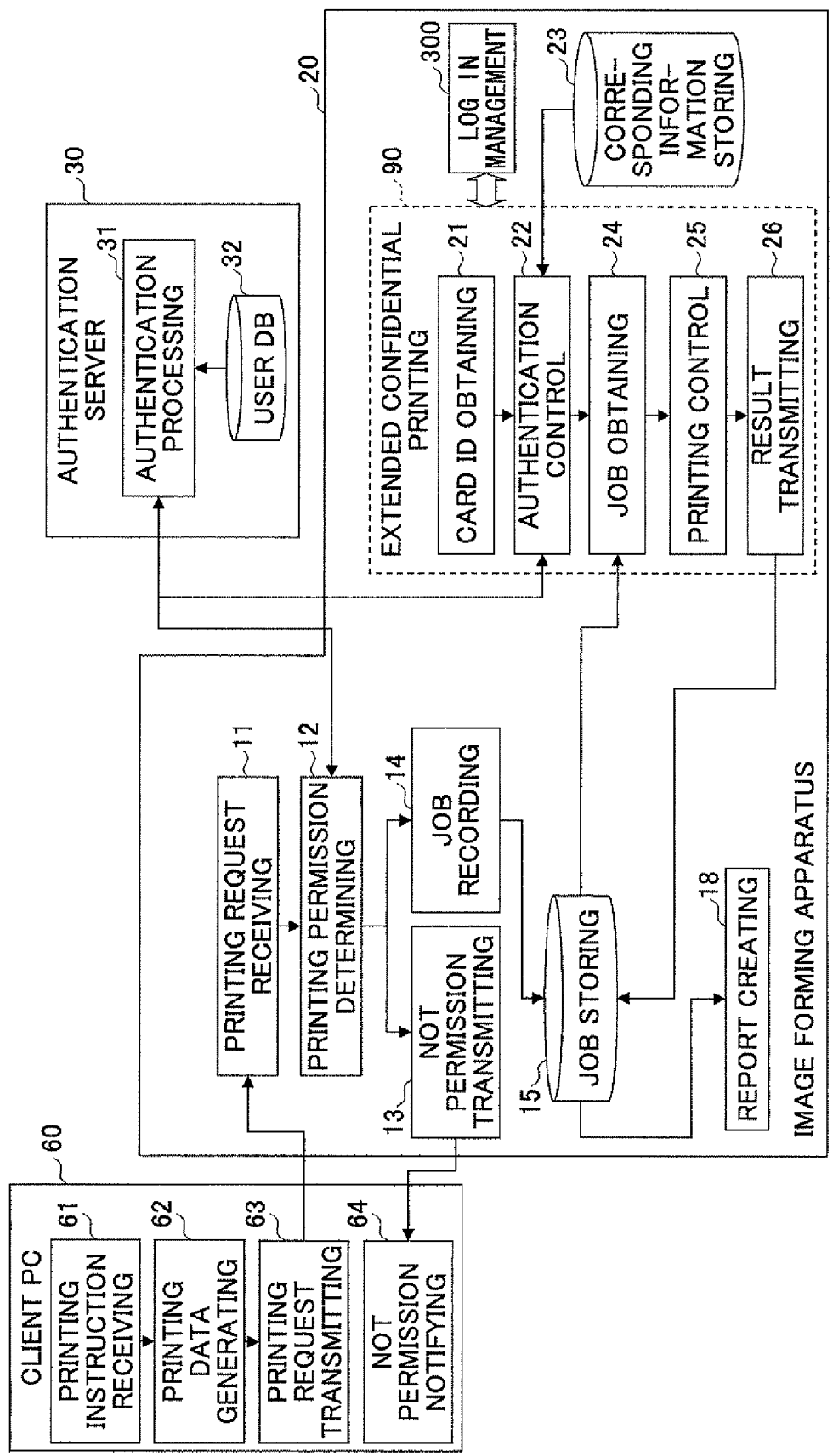
FIG. 10 shows one example of a function block diagram of the print system (without the printing server)

It is noted that a functional block diagram for a mode where the printing server 10 is not provided and the printing jobs are stored in the image forming apparatus 20 is one shown in FIG. 10. In the configuration shown in FIG. 10, the job transferring part 16 and the result receiving part 17 shows in FIG. 7 are not included. However, the other functions are the same as those for the case where the printing server 10 is provided, and therefore, below, description will be made for the case where the printing server 10 is provided in the printing system 1.

[Operation Procedure of Extended Confidential Printing Part 90]

<When Job Is Stored>

Figure 11:
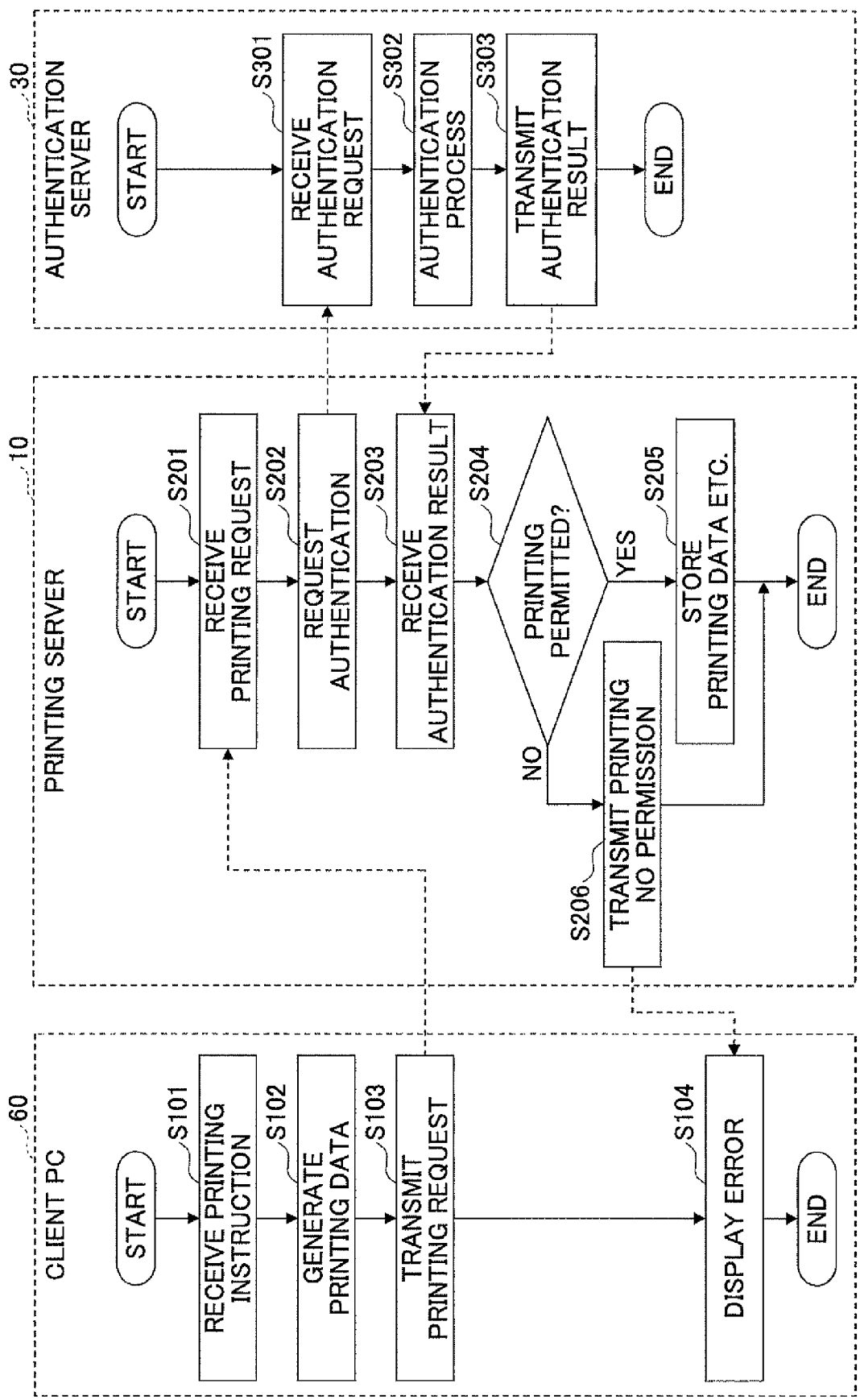
FIG. 11 shows one example of a flowchart showing a procedure in which the printing system stores the printing jobs.

With reference to FIG. 11, a procedure when the printing job is stored will be described. FIG. 11 shows one example of a flowchart showing a procedure of the printing system 1 storing the printing job. In FIG. 11, the user operates the client PC 60.

In step S101, the printing instruction receiving part 61 of the client PC 60 receives, from the user, a selection of document data to be printed (step S101), and causes the display part of the client PC 60 to display the printing setting screen page. The printing instruction receiving part 61 receives, from the printing setting screen page, an input of the printing attribute information and the authentication information (user name and password). It is noted that a screen page for inputting the printing attribute information and a screen page for inputting the authentication information (authentication information inputting screen page) may be provided separately. That is, the printing setting screen page may be a collection of plural screen pages.

Figure 12:
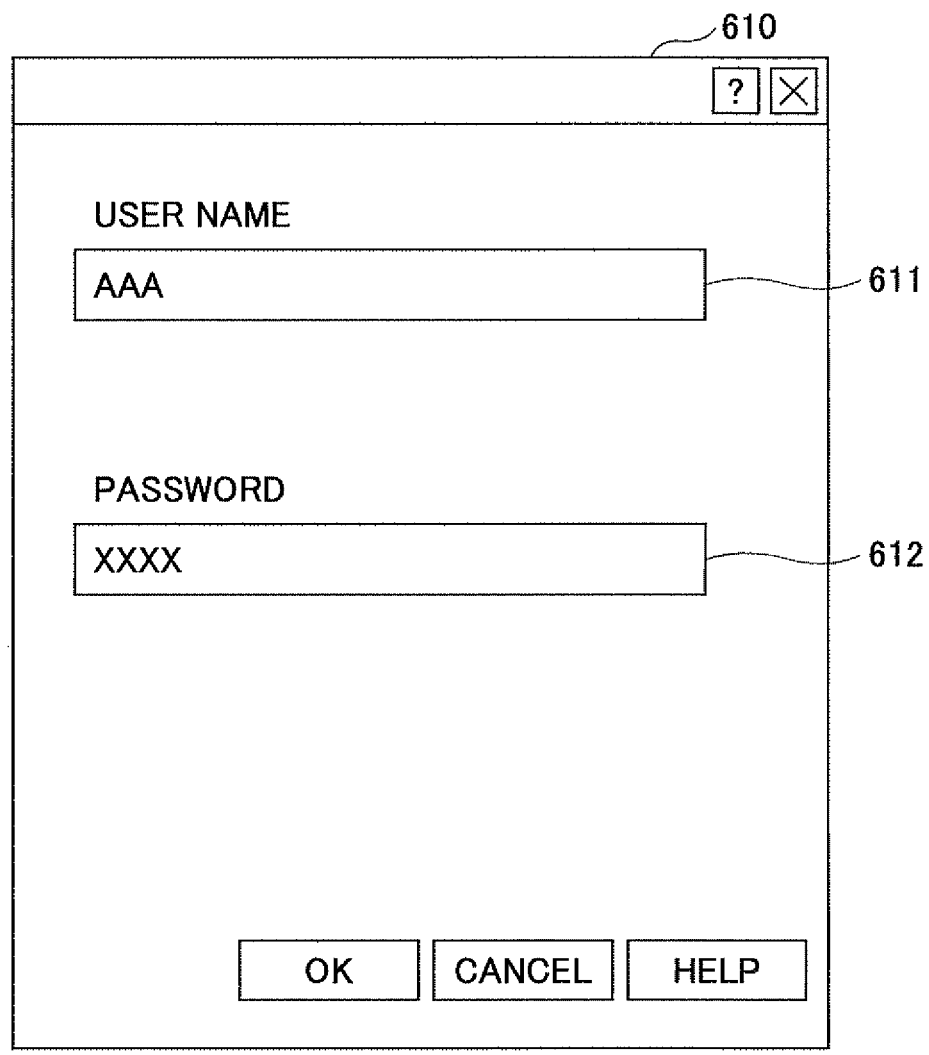
FIG. 12 shows one example of an authentication information inputting screen page of a printing setting screen page.

For example, FIG. 12 shows one example of the authentication information inputting screen page included in the collection of the printing setting screen page. In FIG. 12, the authentication information inputting screen page 610 has a user name inputting field 611 and a password inputting field 612. The printing instruction receiving part 61 receives the user name and password from the authentication information inputting screen page 610.

Next, the printing data generating part 62 generates printing data of the document data to be printed according to the printing attribute information, and records the user name and password having been input in the printing data (step S102). Next, the printing request transmitting part 63 transmits the printing job including the generated printing data to the printing server 10 (step S103). It is noted that identification information (for example, the IP address) of the printing server 10 to which the printing job is to be transmitted is previously stored in a storage (not shown) of the client PC 60.

The printing job is then received by the printing request receiving part 11 of the printing server 10 (step S201). The printing permission determining part 12 then extracts the authentication information from the received printing job, and transmits the extracted authentication information to the authentication server 30 (step S202). Identification information (for example, the IP address) of the authentication server 30 to which authentication is thus to be requested (authentication request) is previously stored in the auxiliary storage 102.

When receiving the authentication request (step S301), the authentication processing part 31 of the authentication server 30 compares the authentication information included in the received authentication request with the authentication information stored for each user in the user DB 32, and thus, carries out authentication (step S302). Next, the authentication processing part 31 transmits the authentication result (information indicating whether the authentication has succeeded) to the printing server 30 as a response (step S303).

When receiving the authentication result (step S203), the printing permission determining part 12 of the printing server 10 determines, based on whether the authentication has succeeded, whether to permit the printing (step S204). That is, when the authentication has succeeded, the printing is permitted (Yes in step S204), and the determination result (the printing has been permitted) is then input to the job recording part 14. The job recording part 14 generates the job ID according to the determination result, and stores the printing job as being associated with the job ID in the job storing part 15 (step S205). Further, the job recording part 14 extracts the printing attribute information from the printing job, and stores the extracted attribute information in the job storing part 15 as the bibliographic information of the printing job as being associated with the job ID.

On the other hand, in a case where the authentication has failed, the printing permission determining part 12 determines that the printing is not permitted (No in step S204), and the determination result (the printing is not permitted) is input to the no-permission transmitting part 13. The no-permission transmitting part 13 transmits the determination result of no permission to the client PC 60 (step S206).

When receiving the determining result of no permission, the no-permission notifying part 64 of the client PC 60 causes the display part of the client PC 60 to display an error message or such indicating that the printing is not permitted (step S104). Therefore, the user can recognize whether the printing is permitted when inputting the printing instruction from the client PC 60. As a result, it is possible to avoid an inconvenient situation that the user finds out that the printing is not permitted after going to the image forming apparatus 20.

Further, as a result of storing of the printing data and so forth for which the printing is not permitted being avoided, it is possible to prevent useless consumption of a storage area of the job storing part 15. Further, it is possible to prevent improper data from being input by a bad faith user.

It is noted that in the above, the printing permission determining part 12 determines whether to permit the printing only based on whether the authentication has succeeded. However, the printing permission determining part 12 may determine whether to permit the printing further based on whether authority for the printing attributes indicated by the printing attribute information exists. In this case, for example, in step S303, in a case where the authentication has succeeded, the authentication processing part 31 of the authentication server 30 obtains the authority information of the user, for which the authentication has succeeded, from the user DB 32, and transmits the obtained authority information to the printing server 10 together with the authentication result. The authority information is information indicating whether usage authority exists for each item (function) corresponding to the printing attribute information. The printing permission determining part 12 compares the authority information with the printing attribute information, and determines to permit the printing when the user has the authority for all the printing attributes (for example, color printing, and so forth) designated to be used in the printing attribute information. On the other hand, in a case where the user does not have the authority for all the printing attributes, the printing permission determining part 12 determines not to permit the printing even when the authentication has succeeded. It is noted that the authority information may be stored in the auxiliary storage 102 of the printing server 10.

Thus, as a result of it being determined whether to permit the printing further in consideration of the usage authority concerning the printing attributes, it is possible to avoid an inconvenient situation that when the user operates the image forming apparatus 20, the printing cannot be carried out because the user does not have the authority.

After the printing job is stored in step S205, the user moves to the desired image forming apparatus 20. That is, the image forming apparatus 20 from which outputting (printing) is carried out has not been determined when the printing job is stored. Therefore, any image forming apparatus 20 with which the printing server 10 is associated, which image forming apparatus is convenient for the user, can be selected for the outputting (printing).

<Job Carrying Out Stage>

A procedure for when the printing job is carried out after the user moves to the desired image forming apparatus 20 will be described. FIG. 13 illustrates a procedure for when the printing job is carried out.

When the user sets the card 50 in the RFID reader/writer 40 for the purpose of logging into the image forming apparatus 20, the card ID obtaining part 21 obtains, from the RFID reader/writer 40, the card ID (referred to as a "current card ID", hereinafter) that the RFID reader/writer 40 has read from the card 50, and stores the current card ID in the memory 202 (step S401). It is noted that to set the card 50 in the RFID reader/writer 40 is to generate a state in which the RFID reader/writer 40 can read the information stored in the card 50 by, for example, inserting the card 50 in the RFID reader/writer 50, holding the card 50 over the RFID reader/writer 40, or so. Further, to cause the card 50 to be unset from the RFID reader/writer 40 is to generate a state in which the RFID reader/writer 40 cannot read the information stored in the card 50 by, for example, causing the card 50 to be unset from the RFID reader/writer 40, causing the card 50 to be away from the RFID reader/writer 50 more than a predetermined distance, or so.

Next, the authentication control part 22 uses the corresponding information stored in the corresponding information storing part 23 to convert the current card ID into the user's authentication information (user name and password) (step S402).

Next, the authentication control part 22 transmits the authentication request including the converted authentication information to the authentication server 30 (step S403). Identification information (for example, the IP address) of the authentication server 30 to which the authentication request is to be transmitted is previously stored in the auxiliary storage 203. In response to the authentication request, the authentication server 30 carries out the same authentication process as that described above with reference to FIG. 11, and transmits the authentication result to the image forming apparatus 20 as a response (steps S301 and S302). The authentication server 30 is not necessarily limited to the single authentication server 30 to be used for each of both the authentication for logging in the image forming apparatus 20 and the authentication for determining whether to permit the printing in the printing server 10, and may be separate authentication servers 30 for both the authentications. However, as a result of the same authentication server 40 being used for each of both the authentications in common, it is possible to improve the likelihood that the determination result of whether to permit the printing and the determination result of whether to permit logging in the image forming apparatus 20 match one another. That is, it is possible to improve the reliability of the determination result of whether to permit the printing in the printing server 10.

Next, the authentication control part 22 of the image forming apparatus 20 receives the authentication result (step S404). In a case where the authentication has failed (No in step S405), the authentication control part 22 does not permit the user's logging in. In this case, the user cannot use the image forming apparatus 20.

In a case where the authentication has succeeded (Yes in step S405), the authentication control part 22 permits the user's logging in. The authentication control part 22 then requests the system management part 57 to carry out the logging in process (step S406). A procedure of the logging in process will be described later.

In response to a success in the logging in process (generation of the user's logged in state), the job obtaining part 24 designates the user name of the user having logged into the image forming apparatus 20 (referred to as a logged in user, hereinafter) and transmits a request for obtaining the job list of the stored printing jobs to the printing server 10 (step S407). Identification information (for example, the IP address) of the printing server 10 from which the printing jobs are to be obtained is previously stored in the auxiliary storage 203. Further, plural printing servers 10 may be registered, and all the printing servers 10 may be used as those from which the printing jobs are to be obtained, or, the user may select the printing server 10 from the plural printing servers 10 from which the printing jobs are to be obtained.

When receiving the request for obtaining the job list (step S211), the job transferring part 16 of the printing server 10 obtains the job list of the printing jobs concerning the user designated in the request, from the job storing part 15 (step S212). It is noted that there is a case where the obtained job list has only one entry. Next, the job transferring part 16 transmits the obtained job list to the image forming apparatus 20 as a response (step S213). It is noted that the associated job IDs are given to the respective printing jobs listed in the job list.

When the job obtaining part 24 of the image forming apparatus 20 has received the job list (step S408), the job displaying part 241 causes the display part 208 to display the job list (step S409).

FIG. 14 shows one example of displaying a printing data list screen page. The printing data list screen page 520 has a printing data list displaying field, a print button 522 and a delete button 523.

The printing data displaying field 521 displays a list of the document name, the stored date/time, the number of pages and so forth of each printing data set concerning the logged in user, from among the printing jobs stored in the job storing part 15. Then, when the user selects (presses) one or more printing jobs from the printing data displaying field 521, the operating control part 58 receives the selection, and the system control part 57 displays the selected print job in a tone inverted manner. When the user selects (presses) the print button 522 from this state, the operating control part 58 receives the selected printing job, notifies the system control part 57 of the selected printing job, and the system control part 57 notifies the selection receiving part 242 of the selected printing job. Further, such a configuration may be provided that in a case where the user presses the delete button 523, the job obtaining part 24 requests the printing server 10 to delete the selected printing job.

Returning to FIG. 13, when the user has thus selected the printing job to be printed from the above-mentioned list via the operating part 209 (step S410), the job obtaining part 24 designates the job ID of the selected printing job and transmits a request for obtaining the printing data to the printing server 10 (step S411).

When receiving the request for obtain the printing data (step S214), the job transferring part 16 of the printing server 10 obtains the printing data associated with the job ID designated in the request, from the job storing part 15 (step S215). Next, the job transferring part 16 transmits the obtained printing data to the image forming apparatus 20 as a response (step S216).

In the image forming apparatus 20, when the job obtaining part 24 has received the printing data (step S412), the printing control part 25 causes the image outputting part 205 to carry out printing based on the printing data (step S413). After the printing is completed, the result transmitting part 26 designates the job ID concerning the printing data having been printed and transmits a message indicating that the printing has been completed to the printing server 10 (step S414).

It is preferable that the job displaying part 241 determines, for each printing job, whether the printing is possible, and displays only the printing jobs for which the printing is possible, and also, displays the job list in such a manner that the user can determine whether the printing according to the printing conditions is possible. Further, it is preferable that, in a case where the user has selected the printing jobs for which the printing according to the printing conditions is possible and the printing jobs for which the printing according to the printing conditions is not possible, the printing jobs for which the printing according to the printing conditions is not possible are skipped, and all the printing jobs for which the printing according to the printing conditions is possible are carried out (skipping of the printing jobs).

For this purpose, the job displaying part 241 compares the function information (for example, describing whether color printing, stapling, punching, bookbinding and so forth are possible) read from the MIB (Management Information Base) of the image forming apparatus 20 and the bibliographic information (printing conditions) of the printing job, and determines whether the printing according to the printing conditions is possible in the image forming apparatus 20. Further, there may be a case where, other than these functions, the image forming apparatus 20 cannot carry out the printing because expendables have not been supplied. Therefore, the printing control part 25 reads the apparatus statuses of the image forming apparatus 20, and determines, for each printing job, whether the printing according to the printing conditions is possible.

When receiving the message indicating that the printing has been completed (step S217), the result receiving part 17 of the printing server 10 deletes the printing job corresponding to the job ID designated in the message, from the job storing part (step S218). As a result of the deleting of the printing job in response to the completion of the printing, it is possible to control the increase of the amount of use of the storage area of the job storing part 15. However, the deleting of the printing jobs may be carried out periodically. In this case, flag information may be given to the printing job indicating that the printing job is to be deleted in step S218. Then, in the periodic deleting process, the printing jobs each having the flag information given may be deleted.

Next, the result receiving part 17 renews the bibliographic information corresponding to the job ID designated in the message indicating that the printing has been completed (step S219). For example, the result receiving part 17 adds the date and time in which the printing has been carried out to the bibliographic information.

It is noted that in the above-mentioned example, the authentication information input to the client PC 60 is then included in the printing job and is transmitted to the printing server 10. However, the transferring of the printing job and the transferring of the authentication may be carried out separately. For example, the authentication information may be first transferred, and after authentication has succeeded, the printing job may be transferred. That is, the authentication information is to be transferred prior to when storing of the printing job and so forth is carried out by the job recording part 14.

<Logging In Process>

FIG. 15 shows one example of a sequence diagram showing a procedure of the logging in process. After receiving the authentication result that the authentication has succeeded (step S404, and Yes in step S405 of FIG. 13), the authentication control part 22 requests the session management part 517 via the API 92 to carry out the logging in process (step S1010). This request includes the user name, the password and the card ID.

The session management part 571 generates the session ID, and registers in the session table the session ID, the user name, the password and the card ID (step S1020).

After starting the session, the session management part 571 notifies the authentication control part 22 that the logging in process has been completed (step S1030). This completion notification includes the session ID.

After receiving the completion notification, the authentication control part 22 determines that carrying out of the printing job has been permitted, and requests the job obtaining part 24 and so forth to carry out the processes starting from step S407 of FIG. 13. The extended confidential printing part 90 then notifies the system control part 57 of the session ID, for example, when the printing is thus to be carried out. When the session ID is valid, the session management part 571 of the system control part 57 shown in FIG. 9 permits carrying out of the printing job concerning the session ID thus notified by the extended confidential printing part 90, and the extended confidential printing part 90 carries out the printing job.

<Card Becoming Unset>

With reference to FIG. 16, a case where the user goes away from the image forming apparatus 20 while the extended confidential printing is being carried out (during the user's logged in state) will be described. FIG. 16 shows one example of a sequence diagram showing a procedure for when the image forming apparatus 20 generates the user's logged out state in response to the card 50 being made unset, as it is regarded as a trigger.

It is assumed that, the image forming apparatus 20 is, for example, in progress of the printing, or waiting for an instruction to carry out the printing. When the user goes away from the image forming apparatus 20 as mentioned above, the user removes the card 50 from the RFID reader/writer 40 so that the card 50 becomes unset from the RFID reader/writer 40.

The device driver 96 (see FIG. 5) of the RFID reader/writer 40 then notifies the event detecting part 572 (see FIG. 9) of the system control part 57 of an event that the card 50 has become unset (step S2010). For this purpose, the device driver 96 of the RFID reader/writer 40 notifies the event detecting part 572 of, for example, an event function "disconnect( )".

The event detecting part 572 calls the printing stop requesting part 301 of the added program 82 (for example, "disconnectEvent( )") in response to the notified event function (step S2020). Thus, the added program 82 obtains the notification of the event that the card 50 has become unset.

Next, the printing stop requesting part 301 requests the printing control part 25 to stop the printing (step S2030). For this purpose, the printing stop requesting part 301, for example, calls a function "cancel( )" that the extended confidential printing part 90 has and requests stopping the printing.

In response to receiving the request for stopping the printing, the printing control part 25 stops the printing (printing stopping process) (step S2040). A specific procedure of stopping the printing depends on whether the image forming apparatus 20 has already started the printing (whether a sequence of processes for the printing, i.e., controlling a paper feeding motor, photosensitive drums, a secondary transferring motor, a fixing motor, and so forth, has been started).

In a case where the printing control part 25 has already started the printing:

The printing control part 25 requests the system control part 57 to carry out processes which are, for example, the same as those that are carried out when a "clear/stop" key on the operating part 209 is pressed by the user. That is, the system control part 57 does not further take paper from a paper feeding tray, and stops the printing after the printing for the paper that is currently being conveyed is completed.

In a case where the printing control part 25 has not started the printing yet:

The printing control part 25 requests the system control part 57 to, for example, prevent the printing job from being carried out.

Next, the printing control part 25 notifies the printing stop requesting part 301 of the result of the printing stopping process (step S2050). Thereby, the log in management part 300 detects that the printing has been stopped. Further, the printing stop requesting part 301 notifies the device driver 96 of the RFID reader/writer 40 of the result of the printing stopping process (step S2060). In FIG. 16, it is shown that the printing stop requesting part 301 directly notifies the device driver 96 of the RFID reader/writer 40 of the result of the printing stopping process. However, actually, the printing stop requesting part 301 notifies the device driver 96 of the RFID reader/writer 40 of the result of the printing stopping process by using the system control part 57.

After the printing stop requesting part 301 receives the result of the printing stopping process, the printing stop requesting part 301 calls the log out requesting part 302. The log out requesting part 302 then requests the session management part 571 to carry out the logging out process (step S2070). For this purpose, the log out requesting part 302, for example, calls a function "logout( )" that the session management part 571 has and requests the logging out process.

The session management part 571 responds to the request and carries out the logging out process (step S2080). The session management part 571, for example, invalidates the session ID of the session table corresponding to the user who is currently logged in, by setting a flag bit that indicates that the user's logged out state has been generated in the session table. Thus, the user's logged out state (state in which the user has logged out) is generated. The session management part 571 notifies the log out requesting part 302 of the result of the logging out process (step S2090). It is noted that in a case where the printing data has been downloaded in the image forming apparatus 20, the system control part 57 deletes the printing data along with the user's logged out state being thus generated. However, in the mode (FIG. 10) in which the printing server 10 is not included in the printing system 1, the system control part 57 does not delete the printing data.

Thus, in response to the user removing the card 50 from the RFID reader/writer 40 so that the card 50 is unset from the RFID reader/writer 40, as it is regarded as a trigger, the sequence of the processes including the process of stopping the printing and the logging out process are carried out. Therefore, the user can ensure the security of the printing job merely by removing the card 50 from the RFID reader/writer 40 so that the card 50 is unset from the RFID reader/writer 40 and going away from the image forming apparatus 20, for a case where, for example, the user has urgent business away from the image forming apparatus 20.

The present invention is not limited to the specifically disclosed embodiments, and variations and modifications may be made without departing from the scope of the present invention.

The present application is based on Japanese priority application No. 2009-212452 filed Sep. 14, 2009, the entire contents of which are hereby incorporated herein by reference.

What is claimed is:

1. An image forming apparatus that associates user identification information with printing jobs and carries out the printing jobs that have been previously stored in a server or a storing part, comprising:
a specifying information obtaining part that obtains specifying information that specifies the user identification information when a portable recording medium that stores the specifying information is set;
an authentication control part that requests an authentication part that authenticates a user by using the specifying information;
a log in permitting part that permits logging in of the user when the user has been authenticated;
a job list obtaining part that obtains a job list of the printing jobs that have been associated with the user identification information from the server or the storing part when the user has been authenticated;
a job displaying part that displays the job list on a display part;
a selection receiving part that receives a selection of one or more of the printing jobs from the job list;
a printing control part that causes printing data of the one or more printing jobs to be printed; and
a printing stop requesting part that requests the printing control part to stop the printing when the specifying information obtaining part has detected that the portable recording medium is unset.

2. The image forming apparatus as claimed in claim 1, further comprising:
a log out requesting part that requests the log in permitting part to generate a logged out state in a case where the printing control part causes the printing of the printing data to be stopped according to the request of the printing stop requesting part.

3. The image forming apparatus as claimed in claim 2, further comprising:
a program obtaining part that reads a first program and a second program that have been written in such a programming language that the first program and the second program can be executed without depending on an execution environment from a second recording medium, or obtains the first program and the second program by using a communication network; and
an execution environment providing part that provides an environment for executing the first program and the second program, wherein
the printing control part is realized as a result of the first program being executed in the environment, and the printing stop requesting part and the log out requesting part are realized as a result of the second program being executed in the environment.

4. The image forming apparatus as claimed in claim 3, wherein
the log out requesting part communicates with the log in permitting part by using a program interface.

5. The image forming apparatus as claimed in claim 1, wherein
the specifying information obtaining part is an IC (Integrated Circuit) card reader that receives the specifying information from the portable recording medium while being in contact with the portable recording medium or without being in contact with the portable recording medium.

6. The image forming apparatus as claimed in claim 5, wherein
the specifying information obtaining part detects that the portable recording medium is unset as a result of detecting that the portable recording medium becomes removed from the IC card reader or the portable recording medium becomes away from the IC card reader by a distance equal to or more than a predetermined distance.

7. A printing job carrying out method of associating user identification information with printing jobs and carrying out the printing jobs that have been previously stored in a server or a storing part, comprising:
specifying information obtaining part obtaining specifying information that specifies the user identification information when a portable recording medium that stores the specifying information is set;
an authentication control part requesting an authentication part that authenticates a user by using the specifying information;
a log in permitting part permitting logging in of the user when the user has been authenticated;
a job list obtaining part obtaining a job list of the printing jobs that have been associated with the user identification information from the server or the storing part when the user has been authenticated;

a job displaying part displaying the job list on a display part;

a selection receiving part receiving a selection of one or more printing jobs from the job list;

a printing control part causing printing data of the one or more of the printing jobs to be printed; and a printing stop requesting part requesting the printing control part to stop the printing when the specifying information obtaining part has detected that the portable recording medium is unset.

8. A non-transitory computer readable information recording medium storing a program which is executed by a computer processor of an image forming apparatus that associates user identification information with printing jobs and carries out the printing jobs that have been previously stored in a server or a storing part, which computer processor, when executing the program, acts as:

a specifying information obtaining part that obtains specifying information that specifies the user identification information when a portable recording medium that stores the specifying information is set;

an authentication control part that requests an authentication part that authenticates a user by using the specifying information;

a log in permitting part that permits logging in of the user when the user has been authenticated;

a job list obtaining part that obtains a job list of the printing jobs that have been associated with the user identification information from the server or the storing part when the user has been authenticated;

a job displaying part that displays the job list on a display part;

a selection receiving part that receives a selection of one or more printing jobs from the job list;

a printing control part that causes printing data of the one or more of the printing jobs to be printed; and a printing stop requesting part that requests the printing control part to stop the printing when the specifying information obtaining part has detected that the portable recording medium is unset.

\* \* \* \* \*